US010816116B2

(12) United States Patent
Ciprich et al.

(10) Patent No.: US 10,816,116 B2
(45) Date of Patent: Oct. 27, 2020

(54) TUBE WITH COMPRESSION FITTING AND FLARED FITTING USED WITH CONNECTION BODY AND METHOD OF MAKING SAME

(71) Applicant: Parker-Hannifin Corporation, Cleveland, OH (US)

(72) Inventors: Samuel Ciprich, Erie, PA (US); Matthew Bernosky, Linesville, PA (US)

(73) Assignee: Parker-Hannifin Corporation, Cleveland, OH (US)

( * ) Notice: Subject to any disclaimer, the term of this patent is extended or adjusted under 35 U.S.C. 154(b) by 29 days.

(21) Appl. No.: 16/284,494

(22) Filed: Feb. 25, 2019

(65) Prior Publication Data
US 2019/0186661 A1    Jun. 20, 2019

Related U.S. Application Data

(60) Division of application No. 12/549,606, filed on Aug. 28, 2009, now Pat. No. 10,215,315, and a
(Continued)

(51) Int. Cl.
*F16L 19/028* (2006.01)
*F16L 19/10* (2006.01)
(Continued)

(52) U.S. Cl.
CPC .......... *F16L 19/028* (2013.01); *B21D 39/046* (2013.01); *F16L 19/045* (2013.01);
(Continued)

(58) Field of Classification Search
CPC ..... B21D 37/18; B21D 39/046; F16L 19/028; F16L 19/0286; F16L 19/0283;
(Continued)

(56) References Cited

U.S. PATENT DOCUMENTS 1,928,836 A * 10/1933 Loughead ............... B25B 27/10
29/507
2,289,382 A * 7/1942 Parker .................. F16L 19/045
285/332.3
(Continued)

FOREIGN PATENT DOCUMENTS

SU    1747223 A1 * 7/1992

OTHER PUBLICATIONS

Armoloy XADC—Diamond Cutting Chromium Coating, https://www.armoloy-wpa.com/xadc-diamond-chromium-coating/, retrieved from Google search on Feb. 24, 2020. (Year: 2017).*

*Primary Examiner* — Jason L Vaughan
(74) *Attorney, Agent, or Firm* — Renner, Otto, Boisselle & Sklar, LLP

(57) ABSTRACT

A high-pressure tube compression fitting/flared fitting for use in combination with a thick-walled tube and a connection body wherein a sleeve is in engagement with a thick-walled tube. The sleeve is generally cylindrically shaped with the exterior thereof coated and then etched. The sleeve includes a first and second sharp inner circumferential biting edges which interengage and bite into and through the exterior of the end portion of the thick-walled tube and into the wall portion of the end portion of the thick-walled tube without narrowing the passageway through the thick-walled tube. The process for making the fitting includes placing an end portion of the thick-walled tube into engagement with a tube engaging surface of a tapered generally cylindrical wall of a guide rod.

15 Claims, 27 Drawing Sheets

Related U.S. Application Data continuation-in-part of application No. 12/205,840, filed on Sep. 5, 2008, now abandoned.

(51) Int. Cl.
  *B21D 39/04*   (2006.01)
  *F16L 19/04*   (2006.01)

(52) U.S. Cl.
  CPC ............ *F16L 19/10* (2013.01); *Y10T 29/4994* (2015.01); *Y10T 29/49428* (2015.01)

(58) Field of Classification Search
  CPC ......... Y10T 29/49428; Y10T 29/49911; Y10T 29/49913; Y10T 29/49925; Y10T 29/49927; Y10T 29/49934
  USPC ................................................. 148/DIG. 51
  See application file for complete search history.

(56) References Cited

U.S. PATENT DOCUMENTS

| | | | | |
|---|---|---|---|---|
| 2,328,468 | A * | 8/1943 | Laffly | F16L 19/045 285/334.2 |
| 2,351,710 | A * | 6/1944 | Sanders | B21C 9/00 72/41 |
| 2,428,474 | A * | 10/1947 | Snively | B21C 1/24 72/283 |
| 2,444,622 | A * | 7/1948 | Wolfram | F16L 19/045 285/332.4 |
| 2,466,057 | A * | 4/1949 | Somma | F16L 19/045 285/3 |
| 2,470,508 | A * | 5/1949 | Maky | F16L 19/045 285/332.4 |
| 2,496,510 | A * | 2/1950 | Wolfram | F16L 19/10 285/341 |
| 2,497,274 | A * | 2/1950 | Richardson | F16L 19/045 285/3 |
| 2,737,403 | A * | 3/1956 | Ellis | F16L 19/10 285/334.2 |
| 2,850,303 | A * | 9/1958 | Bauer | F16L 19/10 285/341 |
| 3,198,874 | A * | 8/1965 | Dahl | B21D 39/06 174/561 |
| 3,201,859 | A * | 8/1965 | Stanley | B21D 39/046 29/282 |
| 3,293,894 | A * | 12/1966 | Edgecombe | B21C 9/00 72/42 |
| 3,294,426 | A * | 12/1966 | Lyon | F16L 19/041 285/334.5 |
| 3,605,476 | A * | 9/1971 | Hinshaw | B21C 1/00 72/274 |
| 3,783,663 | A * | 1/1974 | Prajsnar | B21C 3/00 72/41 |
| 3,970,336 | A * | 7/1976 | O'Sickey | B23P 19/04 285/341 |
| 3,972,112 | A * | 8/1976 | O'Sickey | B23P 19/04 29/516 |
| 4,076,286 | A * | 2/1978 | Spontelli | F16L 19/103 285/341 |
| 4,579,022 | A * | 4/1986 | Kasai | B23P 15/406 216/100 |
| 4,579,634 | A * | 4/1986 | Weglin | C23F 1/04 156/515 |
| 4,585,255 | A * | 4/1986 | Ridenour | F16L 19/14 285/322 |
| 5,217,261 | A * | 6/1993 | DeWitt | F16L 19/065 285/332.2 |
| 5,234,509 | A * | 8/1993 | Tull | C23C 22/12 148/246 |
| 6,276,690 | B1 * | 8/2001 | Gazewood | E21B 23/01 277/336 |
| 7,000,953 | B2 * | 2/2006 | Berghaus | F16L 19/0218 285/332.1 |
| 7,240,925 | B2 * | 7/2007 | Fukano | F16L 47/04 285/243 |

* cited by examiner

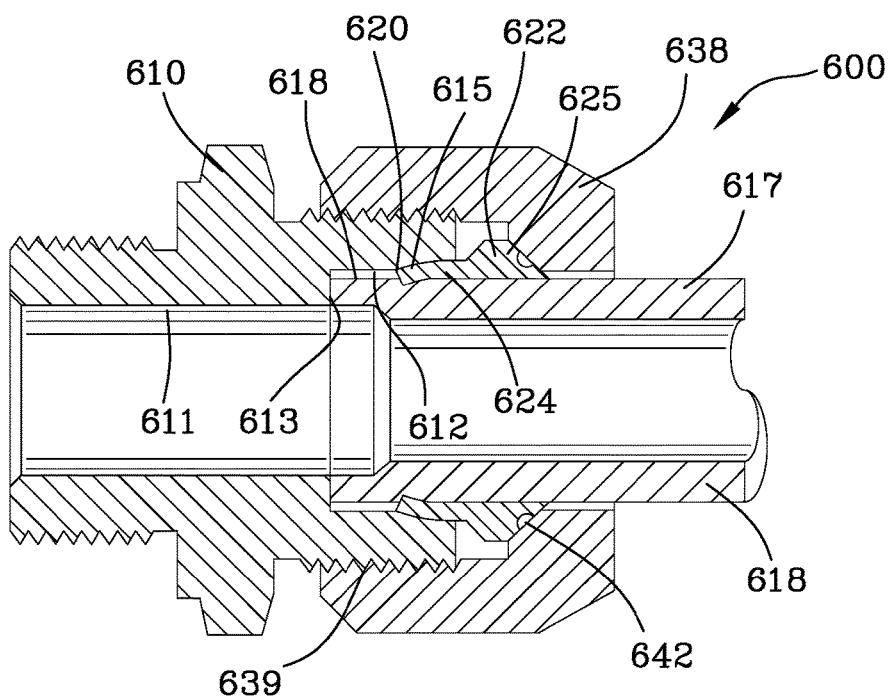
FIG. 6 (PRIOR ART)
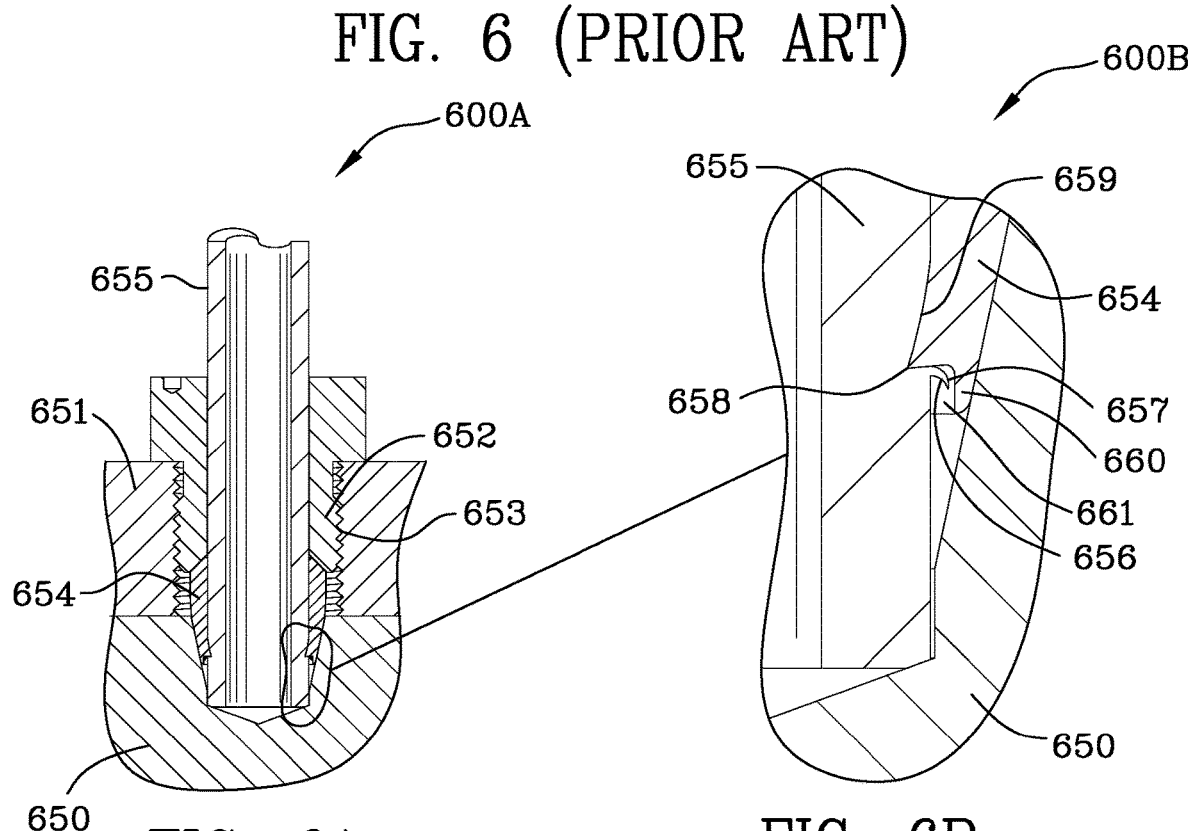
FIG. 6A (PRIOR ART)
FIG. 6B (PRIOR ART)

```
                                                    ┌─ 1500
                                                    ↙

┌─────────────────────────────────────────────────┐
│  Placing a thick-walled tube into engagement    │
│  with the frusto-conical portion of a die such  │
│  that the inner diameter of the tube            │
│  interengages the conical portion of the        │
│  frusto-conical portion of the die, the die     │
│  supported by a driving piston.          1501   │
└─────────────────────────────────────────────────┘
                         ↓
┌─────────────────────────────────────────────────┐
│  Sliding a sleeve over the tube, the sleeve     │
│  includes an interior and an exterior, the      │
│  exterior of the sleeve being etched and        │
│  having a coating thereover, the sleeve         │
│  includes a sharp annular biting portion        │
│  engaging the thick-walled tube, the sleeve     │
│  includes an interior annular symmetric         │
│  concavity, the concavity of the sleeve         │
│  interengaging the thick-walled tube.    1502   │
└─────────────────────────────────────────────────┘
                         ↓
┌─────────────────────────────────────────────────┐
│  Securing the sleeve into forceful engagement   │
│  with the die.                           1503   │
└─────────────────────────────────────────────────┘
                         ↓
┌─────────────────────────────────────────────────┐
│  Driving the die into the thick-walled tube     │
│  and the sleeve with the driving piston;        │
│  flaring the end portion of the                 │
│  thick-walled tube.                      1504   │
└─────────────────────────────────────────────────┘
                         ↓
┌─────────────────────────────────────────────────┐
│  Deforming the sleeve into engagement with      │
│  the thick-walled tube.                  1505   │
└─────────────────────────────────────────────────┘
                         ↓
┌─────────────────────────────────────────────────┐
│  The step of driving the die into the           │
│  thick-walled tube includes forcing and         │
│  engaging the sharp annular biting portion      │
│  with the thick-walled tube deforming the       │
│  tube into engagement with the recess in        │
│  the extended lip.                       1506   │
└─────────────────────────────────────────────────┘

FIG. 15
```

TUBE WITH COMPRESSION FITTING AND FLARED FITTING USED WITH CONNECTION BODY AND METHOD OF MAKING SAME

RELATED APPLICATIONS

This application is a divisional of U.S. patent application Ser. No. 12/549,606 filed Aug. 28, 2009, issued on Feb. 26, 2019 as U.S. Pat. No. 10,215,315, which is a continuation-in-part of U.S. patent application Ser. No. 12/205,840 filed Sep. 5, 2008, all of which are incorporated herein by reference.

FIELD OF THE INVENTION

The invention relates to a tube coupling for connecting a tube to a connection body.

BACKGROUND OF THE INVENTION

FIG. 1 is an enlarged side view 100 of a tube coupling disclosed in prior art U.S. Pat. No. 2,850,202 to M. F. Bauer. FIG. 2 is an enlarged and fragmentary cross-sectional view 200 of the forward end portion of the sleeve 13 shown in the prior art device illustrated in FIG. 1. FIG. 3 is a modified form 300 of the forward end portion of the sleeve 13 illustrated in the prior art device illustrated in FIG. 2. FIG. 4 is a fragmentary side view 400 of the wedge insert 20 illustrating the knurled outer surface 23 portion. FIG. 5 is a fragmentary side view 500 taken along the lines 4-4 of FIG. 2 showing principally the knurled section 23.

U.S. Pat. No. 2,850,303 to M. F. Bauer, entitled Double Sealed Compression Fitting, recites, at col. 3, Ins. 54 et seq. with reference to FIG. 1 thereof, "that the invention comprises generally a coupling or connection body 11, a coupling nut 12, and a contractible sleeve 13 adapted to contractibly engage a tube 10. The coupling body 11 is provided at its right-hand end with male threads 14, which are adapted to be threadably engaged by female threads 15 provided in the nut 12 for pressing the sleeve into engagement with the tube. The male threads 14 and the female threads 15 constitute connection means for drawing the connecting body 11 and the coupling nut 12 toward each other. As illustrated, the connection body 11 is provided with a laterally extending outer wall or an entrance end portion 16 with substantially a conical opening 45 extending into the body from the outer wall 16. The conical opening 45 receives the sleeve 13 and the end of the tube 10 and has an internal annular cam surface 17 with a first end portion 46 disposed adjacent the outer wall 16 and a second end portion 47 within the body member disposed longitudinally remote from the outer wall 16. The first end portion 46 has a maximum diameter and the second end portion 47 has a minimum diameter. The internal annular cam surface 17 slopes radially inwardly in substantially a straight line from the first end portion 46 to the second end portion 47 and defines an acute angle with respect to the longitudinal axis of the tube. Extending longitudinally beyond the inwardly converging cam surface 17 is a socket or counter bore 18 which is provided with a terminating end surface 19. The inwardly converging cam surface 17 may be preferably about nine degrees and preferably may lie in a range of approximately eight to twelve degrees, but may be in a wider range of approximately seven to twenty degrees, measured with respect to the longitudinal axis of the tube.

Mounted in the socket 18 is a wedge insert 20 having an abutting end surface 21 and an annular wedge wall or a flare end surface 22. In assembly, the insert 20 is pressed into the socket 18 until the abutting end surface 21 abuts against the terminating end surface 19 for making a sealing engagement therebetween. In order to resist longitudinal movement of the insert 20 out of the socket 18, there is provided a knurled portion 23 which provides longitudinal spaced ribs therearound to-make an interlocking engagement with the wall of the counter bore or socket 18. As the wedge insert 20 is pressed or driven into the counter bore or socket 18, the smooth or unknurled forward portion acts as a guide and elevated ribs of the knurled portion 23 cut or make their own longitudinal grooves into the wall of the socket or counter bore 18 so that the wedge insert becomes a permanent part of the connection body 11. The terminating end surface 19 of the socket 18 is disposed at a reverse slope of approximately five degrees so that when the abutting end surface 21 of the wedge insert is pressed against the terminating end surface 19 a good fluid seal is made therebetween at substantially the bore of the connection body 11. While I preferably use a knurled section to hold the insert 20 in the socket 18, it is understood that any other suitable means may be employed for this purpose.

When my coupling is used for joining steel tubing to a connection body, I preferably construct the wedge insert 20 of steel which is capable of being quench hardenable throughout its entire mass and thereafter tempered or drawn back to a hardness value greater than that of the tube. I find that steel known as 4140, heat treated throughout its entire mass and tempered to a hardness value of approximately 30 to 45 Rockwell, is satisfactory for my insert. When my coupling is used with copper tubing, the insert is preferably constructed of hard brass so that the insert has a hardness value greater than that of the copper tubing. When my coupling is used with stainless steel tubing the wedge insert may be made of hardenable stainless steel. As illustrated, in the drawing, the flare end surface 22 of the insert 20 terminates at its pointed end in a rounded nose 24. It is to be noted that the outwardly converging cam surface 17 and the annular wedge wall or flare end surface 22 define sides of a substantially triangular space comprising a converging annular walled chamber. The annular wedge wall 22 defines in conjunction with the opening 45 an annular converging space 48 pointing away from the outer wall 16 to receive the end of the tube which extends beyond the contractible end portion of the sleeve 13. The annular wedge wall 22 has first end region 49 having a minimum diameter to fit inside the tube and has a second end region 50 with a maximum diameter upon which the end of the tube slides as it is being flared. The annular wedge wall 22 slopes radially outwardly in substantially a straight line from the first end region 49 to the second end region 50 and has an acute angle with respect to the longitudinal axis of the tube. The internal annular cam surface 17 and the wedge wall 22 are angularly disposed with respect to each other and define an acute angle therebetween. The second end portion 7 of the internal annular cam surface 17 and the second end region 50 of the annular wedge wall 22 converge toward each other, and they have surfaces with a radial distance therebetween less than the wall thickness of the tube to wedgingly receive the end of the tube. The internal annular cam surface 17 has an intermediate portion 51 between the first and second end portions 46 and 47. The intermediate end portion 51 is longitudinally coextensive with and surrounds the first end region 49 of the annular wedge wall 22.

The sleeve 13 has a bore 31 adapted to surround the tube and comprises a continuous annular body 25 provided with rearwardly extending segmental fingers 20 which grip the tube when the nut is tightened. When my coupling is used with steel tubing, this sleeve is preferably constructed of steel which is capable of being quench-hardenable throughout its entire mass and thereafter tempered or drawn back to a hardness value greater than that of the tube. I find that steel known as 4140, heat-treated throughout its entire mass and tempered to a hardness value of approximately 30 to 45 Rockwell, is satisfactory for my sleeve. When my coupling is used with copper tubing, the sleeve is preferably constructed of hard brass so that the insert has a hardness value greater than that of the copper tubing. When my coupling is used with stainless steel tubing the sleeve may be made of hardenable stainless steel.

In the manufacturing of the sleeve, the fingers 26 are provided by making slots 27 in the rearward section thereof at annularly spaced intervals thereabout. In FIG. 1, four slots are used, but any number may be used. The continuous annular body 25 has a leading or forward contractible end portion 28 and a rearward end portion 29. As illustrated, the end portion 29 constitutes the forward terminus for the slots 27. The leading or forward contractible end portion 28 has at its forward end a cam surface 30 which engages the inwardly converging camming surface 17 of the connection body 11. The inside surface of the leading or forward contractible end portion 28 of the sleeve is preferably provided with a major rib 32 which is longitudinally spaced from the end of the sleeve. The inside diameter of the rib 32 is preferably about the same diameter as the bore 31 of the sleeve. In order to provide for making the rib, the inside surface of the forward end portion of the sleeve is recessed at an angle preferably about five degrees, thereby making the recess wall 34. The depth of the major rib 32 may be in the neighborhood of 0.012 inch. The rib 32 is provided with forward edge 35 which constitutes a biting edge for biting into the tube.

The forward edge 35 constitutes laterally extending circumferential walls terminating in circumferential cutting edge to bite and make its own grooves into the outside surface of the tube. The forward edge 35 of the rib 32 faces the annular wedge wall 22. The radial distance between the first end region 49 of the annular wedge wall and the intermediate portion 51 of the internal annular cam surface 17 is less than the lateral wall thickness of the tube plus the lateral thickness of the sleeve between the outer cam surface 30 and the circumferential cutting edge of the rib 32. The outer cam surface 30 prior to assembly has a diameter less than the maximum diameter of the first end portion 46 of the internal annular cam surface 17 and greater than the minimum diameter of the second end portion 47 of the internal annular cam surface 17 and initially contacts the internal annular cam surface 17 between the first end portion 46 and the intermediate portion 51.

The portion of the sleeve in advance of the major rib 32 constitutes an auxiliary body or shell 37. This shell functions to support the outside wall of the tub in advance of the major rib 32. The intermediate part of the entire sleeve, that is, the rearward end of the continuous annular body 25 and the forward end of the segmental fingers 26 is enlarged to provide a tapered or cam shoulder 38 against which a cam shoulder 39 of the nut engages for pressing the contractible sleeve into the inwardly converging cam surface 17 of the connection body 11. The tightening of the nut against the cam shoulder 38 of the sleeve contracts the segmental fingers about the tube for supporting the tube against vibration. It is to be noted that the cam shoulder 39 on the nut oppositely faces the converging cam surface 17 and the terminating end surface 19 of the socket, as well as the flare end surface 22 of the insert.

In assembly, as the sleeve is pressed forward by the tightening of the nut, the outer annular cam surface 30 of the sleeve forcibly engages the inwardly converging cam surface 17 of the connection body and thereby produces a camming action which cams or deflects the leading or forward contractible end portion 28 of the sleeve against the tube. The camming action embeds the rib 32 into the tube. The rib 32 makes its own groove in the outer surface of the tube so that as the nut is further tightened, the end of the tube is forced into the triangular space with the inner surface of the tube riding upwardly upon the annular wedge wall or flare end surface 22 of the insert for self-flaring the end of the tube in advance of the major rib 32.

From the above description, it is noted that the coupling during the initial stages of the assembly operates as a no-flare fitting, whereby the outside and inside walls of the sleeve make fluid sealing engagement respectively with the converging cam surface 17 of the connection body and the outside surface of the tube. As the nut is further tightened during the final stages of the assembly of the coupling, the inside surface of the tube rides up upon the annular wedge wall or flare end surface 22 for flaring the tube, whereby another seal is effected between the tube and the insert 20. In other words, during the final stage of assembly, the flare end of the tube is pressed between the sleeve and the annular wedge wall or flare end surface 22 of the insert 20. The force of the end of the tube against the annular wedge wall or flare end surface 22 forces the entire insert into the socket 18, whereby the abutting end surface 21 of the insert makes good fluid seal engagement with the terminating end surface 19 of the connection body.

The circumferential cutting edge of the rib 32 cuts its own grooves into the outside surface of the tube with the laterally extending circumferential wall 35 pressing against the side wall of the groove. The laterally extending circumferential side wall 35 of the rib and the side wall of the groove against which it presses provide a driving engagement between the tube 10 and the sleeve 13 thereby carrying the tube along with the sleeve forcing the inside surface of the end of the tube with a wedging movement against the annular wedge wall 22 to flare the end of the tube in advance of the circumferential cutting edge 35 of the rib 32. The flaring of the end of the tube permits the sleeve 13 and the tube 10 carried there along to move farther into the conical opening 45, for pressing the end of the tube wedgingly into the converging space between the second end portion 47 of the internal annular cam surface 17 and the second end region 50 of the annular wedge wall 22 with the outside surface of the tube making wedging contact against the second end portion 47 of the internal annular cam surface 11 and the inside surface of the tube making a wedging contact with the second end region 50 of the annular wedge wall 22. These wedging contacts limit the movement of the tube into the converging space between the second end portion 47 of the internal annular cam surface 17 and the second end region 50 of the annular wedge. The flaring of the end of the tube also permits the sleeve 13 and the tube 10 carried there along to move farther into the conical opening 45 for pressing the tube and the contractible end portion 28 of the sleeve wedgingly into the converging space between the first end region 49 of the annular wedge wall 22 and the intermediate portion 51 of the internal annular cam surface 17 with the outer surface on the sleeve making a wedging engagement against the intermediate portion 51 of the internal annular cam surface 17 and with the inside surface of the tube making a wedging engagement with the first end region 49 of the annular wedge wall 22. These first and second wedging engagements in combination with the driving engagement between the laterally extending circumferential wall and the side wall of the groove against which it presses arrest the movement of the sleeve 13 into the converging space between the intermediate portion 51 of the internal annular cam surface 17 and the first end region 49 of the annular wedge wall 22. The circumferential cutting edge of the rib 32 upon final assembly of the tube is laterally spaced from the first end region 49 of the annular wedge wall 22 for a distance which is less than the lateral distance of the wall thickness of the tube.

During the final stages of assembly, the shell 37 functions as a preformed chip, filling substantially all the small triangular space between the outside surface of the tube and the inwardly converging cam surface 17, with the result that there is no more space into which loose metal from the tube in advance of the major rib 32 may flow when an extraordinarily heavy force is applied to the tightening of the nut. The wall thickness of the shell 37 may be 0.010 inch to 0.020 inch and the length thereof may be preferably about ⅟₃₂ inch or slightly longer. In actual observation, with a coupling cut in section, the small triangular space is substantially undiscernible, because the metal under pressure tends to flow somewhat to make the triangular space in actual construction smaller than it appears upon the drawing, which does not take into account the flow of the metal under pressure. Inasmuch as the annular wedge wall or end surface 22 supports the end of the tube, the coupling may be assembled and disassembled in an unlimited number of times because upon each assembly, the joined parts produce a "rock-bottom," "hit-home" feeling to the nut, since there is no substantial space into which the metal which is under sealing pressure may flow.

FIG. 2 shows the parts in the assembled condition with the view enlarged. In FIG. 3, Bauer illustrates a modified form of the leading or forward end portion of the sleeve in that the ribs have been replaced by a forward biting edge or shoulder 40 which bites into the tube for making a sealing engagement therewith. The action of the forward biting edge 40 after it makes its own groove into the tube is substantially the same as that for the ribs. The shell 41 is also provided in advance of the forward biting edge 40 in order to support the metal of the tube in advance of the biting edge, as well as to substantially seal the small triangular space between the outside surface of the tube and the inwardly converging cam surface 17 of the connection. The assembly of the coupling with the modified sleeve in FIG. 3 is the same as that for the sleeve shown in FIGS. 1 and 2. From the foregoing description, it is noted that the Bauer coupling claims to be a combination of both the flare and the no flare types of couplings, and thus obtain the advantages of each while overcoming their disadvantages. Bauer claims to avoid the necessity for flaring the tube in advance of assembly of the coupling as would be necessary with a flare fitting. Further, Bauer claims that his invention overcomes the disadvantage of the no flare fitting in that it obtains a "rock-bottom," "hit-home" feeling when tightening the nut during repeated assembly of the fitting.

In FIGS. 1, 2, and 3 of the drawing, the wall thickness of the tubing is approximately 0.049 inch. With my assembled coupling cut in section and under actual observation, the end of the tube would have a small triangular space 48 in advance thereof. The FIGS. 6 and 7 show the use of my coupling with tubing having a wall thickness of approximately 0.035 inches. Here the triangular space 48 in advance of the end of the tube is somewhat smaller than it is in FIGS. 1, 2, and 3. The FIGS. 8 and 9 show the use of my coupling with tubing having a wall thickness of approximately 0.065 inch. In this instance, the triangular space 48 in advance of the end of the tube is somewhat larger than it is in FIGS. 1, 2, and 3.

My tube coupling accommodates tubing having a wide range of wall thicknesses. One aspect of the invention is that regardless of the wall thickness of the tubing, the distance between the forward end of the tube and the forward end of the sleeve bears about the same relation to each other in the assembled fitting. One would ordinarily conclude that this relationship could not be, and it is difficult to explain the reason therefor. Regardless of the explanation, it is to be pointed out that the rib 32 or the biting edge 40 of the sleeve makes a driving connection between the sleeve and the tube. This driving connection forces the forward end of the tube against the flared wedge wall 22 and thereby self-flares the end of the tube. At the same time, the forward end of the tube is coined or pressed into the triangular space 48. As the forward end of the tube is pressed into the triangular space 48, the outside surface of the forward end of the tube is coined between 47 and 50 and possibly extruding the wedged end of the tube therebetween with the result the end of the tube becomes tapered and elongated. In actual practice, the outer surface of the tube at the forward end thereof at 47 becomes tapered and burnished as the nut is tightened, providing a first perfect sealing area between both sides of the tube against the minimum spaced wall portions 47 and 50.

In the final assembly of the tubing, the minimum spaced wall portions between 47 and 50 arrest the forward movement of the tube therebetween, into the triangular space 48. One novelty of the connection is that the forward end of the tube is arrested in its forward movement between the minimum spaced wall portions 47 and 50, while the sleeve and tube as a unit is arrested in its forward movement between the maximum spaced wall portions 51 and 49, providing a second perfect sealing area. It is to be noted that the invention has a first perfect sealing area for the tube alone between 47 and 50 and a second perfect sealing area for the tube and sleeve as a unit between 51 and 49. These two perfect sealing areas are longitudinally spaced apart and both sealing areas reside between tapered wedging surfaces, namely, the cam wall 17 and the wedge wall 22. Ordinarily when an attempt is made to match machine tolerances to obtain two perfect sealing areas at two longitudinally spaced tapered regions, such as shown in this invention, difficulty arises from the inability to match such tolerances. Both areas do not effect their seal simultaneously. Usually one area "hit-home" or seals before the other. In this invention, the matching of tolerances is accomplished automatically and constitutes one of the unexpected results of my invention. The problem of matching tolerances becomes all the more complex when it is realized that my fitting accommodates tubing having varying tube wall thicknesses. One explanation for the automatic accommodation of matching tolerances arises from two facts: (1) that the coining of the end of the tube at 47 allows the end of tube to wedgingly move forward into triangular space 48, and (2) that probably with tubing of different wall thicknesses, the rib 32 or the biting edge 40 may variably skid or move longitudinally with respect to the tube so that a first perfect seal is made at the end of the tube between 47 and 50 simultaneously with the making of a second perfect seal for the sleeve and tube as a unit between 51 and 49."

The Bauer patent design is double sealing making: (1) a first perfect seal at the end of the tube between: (a) the second end region 50 of the internal annular cam/wedge wall 22 of the insert 20 and the tube 10, and, (b) the region 47 of the internal cam 17 of the connection body and the tube 10; and, simultaneously (2) making of a second perfect seal for the sleeve 13 and tube 10 as a unit between: (a) intermediate portion 51 of the internal annular cam 17 of the connection body 11 and the sleeve/tube combination, and, (b) the first end region 49 of the annular wedge wall/cam 22 of the insert 20 and the sleeve/tube combination. The Bauer patent discloses a triangular apex 33 meeting at a point and it is this apex into which the sleeve/tube combination is driven. Also disclosed in the Bauer patent is a bore 42 through the insert 20.

The Bauer connection is assembled in a single step with flaring taking place at assembly. The Bauer patent design is vague in describing what tubing materials that it can be used with. Its tubing materials are described as copper, steel, stainless steel. The instant invention is for use primarily with cold worked 300 series stainless steel which is much harder than the tubing the Bauer design uses. The Bauer patent design mentions tubing wall thicknesses of 0.035 to 0.065, the majority of tubing sizes used with the instant invention have a wall thickness greater than 0.065. The Bauer the '303 patent does not mention any surface hardening of the sleeve. It is apparent when viewing FIGS. 1, 2, 3, 6, 7, 8 and 9 of the '303 patent to Bauer is that sleeve 13 is long and includes a long continuous annular body 25 provided with rearwardly extending fingers. It is also apparent from Bauer that sleeve 13 and, in particular, annular body 25 buckles upon loading when nut 12 is torqued as can be seen by the gap between the tube body and the sleeve. Therefore, the "hit home" feeling may not be achieved upon over torqueing the nut 12 thus limiting the load that can be applied to the sleeve 13 by the nut 12.

FIG. 6 is a cross-sectional view 600 of prior art U.S. Pat. No. 3,970,336 to O'Sickey for a tube coupling joint. FIG. 6 illustrated herein is substantially the same as FIG. 1 of the '336 patent to O'Sickey. Referring to FIG. 6, bore 611 and bore 612 are illustrated in the joint. Transverse shoulder 613 abuts body 610. Body 610 includes a cam surface 615 which engages radially contractible portion 624 of sleeve 622 as coupling nut 638 is threaded 639 to body 610. Tube 617 includes outer portion 618. Tube 617 may be a relatively thick walled tube and is engaged by radially contractible portion 624 of sleeve 622 which forms a transverse shoulder 620. Enlarged portion 625 includes a tapered shoulder 642 driven by a corresponding surface of coupling nut 638.

U.S. Pat. No. 3,970,336 uses two processes. The first process creates a compression fitting/flared fitting using a hydraulic tool. The compression fitting/flare fitting is then removed and tightened by hand in its connection for final assembly. The O'Sickey '336 patent uses a cylindrically flared tube. The instant invention, among other things, uses a tapered flare. The O'Sickey '336 patent is for use with heavy wall tubing but it does not mention what material the tubing is made of or the pressure it will be used at in service. The O'Sickey patent design does not specify any materials, hardening or surface hardening of any of the components used for flaring, or connection makeup. The O'Sickey patent design seals in two places. One seal point is where the sleeve contacts the tubing and the other seal point is where the sleeve contacts the body. Sleeve 622 in O'Sickey contacts process fluid.

FIG. 6A is a cross-sectional view 600A of a prior art design. FIG. 6B is an enlargement 600B of a portion of FIG. 6A. Autoclave Engineers Fluid Components Division uses a fitting illustrated in FIGS. 6A and 6B for cold-worked stainless steel tubing 655 which includes a sleeve 654 wherein only a mechanical bite 658 is cut into the tubing. Housing 651, die 650, gland 652, and threads 653 between housing and gland are illustrated in FIG. 6A. The design illustrated in FIGS. 6A and 6B includes a sleeve 654 which acts like a cutting tool shaving material from the tubing wall. Annular hook-shaped peel 656 is illustrated in FIGS. 6A and 6B as is the tip portion 657 of the peel. Interengagement 659 of sleeve 654 and tubing 655 as well as the sleeve lip of sleeve extension 660 are illustrated in FIGS. 6A and 6B. Reference numeral 661 illustrates the gap between the sleeve extension 660, tube 655 and annular hook-shaped peel 656. Reference numeral 661 represents the gap between the sleeve extension 660, tube 655 and annular hook-shaped peel 656. No flare is used in the compression fitting of FIGS. 6A and 6B.

SUMMARY OF THE INVENTION

A tube fitting for use in combination with a thick-walled tube and a connection body wherein a sleeve is in engagement with a thick-walled tube. The sleeve is generally cylindrically shaped with the exterior thereof etched. The sleeve includes a sharp annular biting portion engaging the thick walled tube. The sleeve further includes an inner annular symmetric concavity which engages the thick-walled tube upon deformation thereof. The thick-walled tube includes a flared end portion. A gland about the thick-walled tube engages the sleeve forcing it into engagement with the frusto-conical portion of the connection body coupling the tube, tube fitting and connection body together. The flared end of the thick-walled tube interengages and seals the frusto-conical portion of the connection body. A process for making the device includes the step of placing the thick-walled tube into engagement with the frusto-conical portion of a die to flare the end portion of the thick-walled tube.

The sleeve includes an end portion having an extended lip portion and wherein the thick-walled tube includes a bulbous portion engaging the extended lip portion of the sleeve. The sleeve interengages the thick-walled tube near the end portion of the thick-walled tube. The extended lip portion forms a cavity in the sleeve. The thick-walled tube includes a bulbous portion engaging the extended lip portion of the sleeve. The exterior of the sleeve includes first and second tapered surfaces.

The sleeve has a longitudinal axis and the extended lip portion includes a recess (cavity). The recess (cavity) includes first and second legs and the first leg is substantially parallel to the longitudinal axis and the second leg is substantially transverse to the first leg. The first and second legs form an angle less than 90°.

The tube fitting is also usable in combination with a thick-walled tube and a connection body. A gland about the thick-walled tube is engageable with the sleeve.

The gland includes exterior threads thereon which are matingly threaded into a connection body which includes a frusto-conical portion. The exterior threads of the gland interengage the interior threads of the connection body, coupling the tube, the tube fitting and the connection body together. The flared end of the thick-walled tube interengages and seals against the frusto-conical portion of the connection body. The connection body further includes an exterior and a leak detection passageway extending to the exterior of the connection body.

The process for making a tube fitting for use in combination with a thick-walled tube includes the steps of: placing a thick-walled tube into engagement with the frusto-conical portion of a die such that the inner diameter of the tube interengages the tube engaging surface of the frusto-conical portion of the die, the die being supported by a driving piston; sliding a sleeve over the tube, the sleeve includes an interior and an exterior, the exterior of the sleeve having a coating thereover and then being chemically etched with, for instance, an appropriate acid, the sleeve includes a sharp annular biting portion engaging the thick-walled tube, the sleeve includes an interior annular symmetric concavity, the concavity of the sleeve interengaging the thick-walled tube; securing the sleeve into forceful engagement with the die; driving the die into the thick-walled tube and the sleeve with the driving piston; flaring the end portion of the thick-walled tube; and, deforming the sleeve into engagement with the thick-walled tube. The sliding sleeve has a longitudinal axis and the extended lip portion includes a recess (cavity). The recess includes first and second legs and the first leg being substantially parallel to the longitudinal axis and the second leg being substantially transverse to the first leg. The step of driving the die into the thick-walled tube includes forcing and engaging the sharp annular biting portion with the thick-walled tube includes deforming (extruding) the tube into engagement with the recess (cavity) in the extended lip.

The invention includes a forming operation and deforms (extrudes) the tubing material into the desired shape and requires a high force to flare the tubing wall. The invention employs a sleeve wherein the wall thickness of the sleeve is relatively thick and the overall length is relatively short to increase resistance of the sleeve to buckling. The angle formed between the non-biting end of the sleeve and the gland is 30 degrees instead of some designs employing 45 degrees from horizontal to eliminate deformation of the gland material outward from the axis of the flared joint. The invention uses both a mechanical bite (compression fitting) and a flared tube end (flared fitting).

Creation of the tubing bite (compression fitting) and flared end (flared fitting) are performed in a single operation before assembly in the connection body. Once the compression fitting/tube flaring operation has been completed then the final assembly is accomplished wherein the fitting is interconnected with a connection body.

In the creation of the fitting, the die is forced upward by a hydraulic cylinder toward the cap which is held in place with a threaded interconnection in the housing. The die engages the sleeve on a taper which in turn causes the sleeve to engage the gland on a taper. As the die continues to move upwardly the sleeve is prevented from collapsing outwardly as the gland supports the sleeve and is held in place by the cap. Initially, and before the die begins moving upwardly, the tubing rests on the tube engaging surface of the frusto-conical portion of the die and is slidably movable within the sleeve and the gland against the force of gravity and can be moved freely upwardly.

As the die is moved upwardly, the sleeve is compressed against the gland by the die. The sleeve includes an extended lip portion (overhanging nose) with a radius that prevents the hardened surface of the sleeve (i.e. coated with an XADC-Armoloy® coating from damaging the tapered surface of the die.) XADC-Armoloy® is a trademark of Armoloy Corporation. Use of XADC-Armoloy® creates a hardened surface while maintaining sufficient lubricity. Before the die begins its upward movement under the force of the hydraulic screw piston, a cavity exists between the extended lip portion of the sleeve and the tube. The tapered exterior surfaces of the sleeve are deformed to substantially match the sleeve engaging tapered inner wall surface of the die. At the same time the biting edge of the sleeve begins to penetrate the tube surface forcing the inside corner of the tube against the sleeve engaging taper of the frusto-conically shaped portion of the die. A relief in the sleeve and use of the XADC-Armoloy® coating on the exterior surface of the sleeve (which increases the surface hardness of the sleeve) in combination ensures that the annular biting edge of the sleeve penetrates the tube.

As the die continues to move upwardly toward the cap, the taper of the sleeve engaging surface of the die forces the annular biting edge of the sleeve into the tube deforming the tube material prohibiting movement of the tubing upwardly and simultaneously causes the annular inside corner of the tube end to be deformed and flared outwardly.

When the die comes into contact with the cap, material from the tube has filled the extended lip portion and the cavity defined by extended lip portion sleeve end and the tube end is flared out to a greater diameter than the inside of the sleeve. The pressure is then vented from the hydraulic cylinder, and the gland, sleeve and tube are removed by unthreading the gland from the cap. The flared tube end is now ready for final assembly into its matching connection opening.

The flare connection assembly includes the steps of inserting the tube and sleeve into the connection opening. Then the gland is threaded in and tightened by hand. The bottom of the connection opening has a surface formed in frusto-conical shape which seals on the inside of the tubing flare. The angle of the flared tube end and the frusto-conical shape are dissimilar so the seal starts as an annular surface contact on the frusto-conically shaped protrusion at the base of the housing of the connection. When the gland is torqued the sleeve contacts the inward taper in the connection body causing the sleeve to grip the tube which helps the fitting resist vibration and applies a force to the deformed (raised) tubing material as the bite increases the load carried through the tube to the frusto-conically shaped protrusion at the base of the connection. This deforms the material of the tube as required to achieve the metal to metal seal. The surface of the gland has a coating to reduce friction and permit the torque required for the seal to be applied. Further torqueing of the gland applies additional force to the sleeve, the tube and may increase flaring of the tube.

The structure of the compression fitting/flare fitting includes inherent safety features which allow the person assembling the device to determine if the sleeve does not effectively bite into the tube correctly. Specifically, the end of the tube will not flare correctly giving a visual indication that the process to form the fitting was unsuccessful. With most high pressure compression fittings it was not possible to make visual inspection to know if the mechanical bite was made correctly, the only way to know if the fitting was made correctly was to test it through use. In addition, were the bite to fail, the flared tube end of the invention would not be able to pass through the sleeve thus preventing ejection of the tubing. Tube ejection is a common failure mode of incorrectly assembled compression fittings and has the potential to cause serious injury.

If the flare does not seal correctly there is a bleed hole or passageway so pressure cannot build up around the sleeve or connection threads and cause a possible failure resulting in part ejection. This also allows for a visual indication that a connection is leaking.

Preferred materials of construction include: (1) the tubing is made of cold worked 300 series stainless steel; (2) gland is made of cold worked 316 stainless steel coated with baked on Molykote® (molybdenum disulfide), a registered trademark of Dow Corning Corporation; (3) cap is made of alloy steel; (4) the sleeve is made of through hardened Inconel 718 stainless steel (Rockwell hardness 36) (other steel alloys may be used) with XADC-Armoloy® Coating (Rockwell hardness 93) or TDC-Armoloy® Coating (78 Rockwell hardness); (5) the die is made of hardened steel; (6) the housing is made of aluminum; and, (7) a hydraulic cylinder. When the flared tubing engages the frusto-conical portion of the connection body a seal is formed and the sleeve remains dry (not in contact with the process fluid). In view thereof, the sleeve may be made of many different alloys. Further, the gland may be coated with other lubricants.

Another example of the invention is disclosed. A tube fitting for use in combination with a thick-walled tube is disclosed wherein the thick-walled tube includes a passageway therethrough defined by a cylindrically shaped interior surface. The tube is used in combination with a second example of a sleeve. The thick-walled tube includes a cylindrically shaped exterior surface and a wall portion. The thick-walled tube includes an end portion which is flared for connection with a connection body for communication of fluid through the tube and connection body. The second example of a sleeve includes two inner circumferential biting edges which extend equidistantly into the thick walled tube without any substantial deformation of the tube. Thus, the flow through the fitting and the connection body is not disturbed.

The second example of the sleeve includes a first end portion, an intermediate portion and a second end portion. Further the second example of the sleeve includes an inner bore through the first end portion, the intermediate portion and the second end portion of the sleeve. The inner bore of the sleeve includes an interior surface and the sleeve includes an exterior surface. The first end portion of the sleeve includes a first varying wall thickness between the interior surface and the exterior surface of the sleeve proximate the first end portion. The second end portion of the sleeve includes a second varying wall thickness between the interior surface and the exterior surface of the sleeve proximate the second end portion. The intermediate portion of the sleeve includes a third varying wall thickness between the interior surface and the exterior surface of the sleeve proximate the intermediate portion. A thin coating 0.0003-0.0006 inches thick of XADC-Armoloy® is preferably applied to the exterior of the sleeve and the coating may be etched with an acid or other suitable etchant.

The inner bore of the second example of the sleeve through the first end portion includes a first shoulder terminating in a first sharp inner circumferential biting edge. The inner bore of the second example of the sleeve through the first end portion also includes a second shoulder terminating in a second sharp inner circumferential biting edge. The first sharp inner circumferential biting edge has a first diameter and the second sharp inner circumferential biting edge has a second diameter. The sleeve engages the thick-walled tube.

The first sharp inner circumferential biting edge has a first diameter which interengages and bites into and through the exterior of the end portion of the thick-walled tube and into the wall portion of the end portion of the thick-walled tube without narrowing the passageway of the thick-walled tube. The second sharp inner circumferential biting edge has a second diameter which interengages and bites into and through the exterior of the end portion of the thick-walled tube and into the wall portion of the end portion of the thick-walled tube without narrowing the passageway of the thick-walled tube.

The second varying wall thickness of the reinforcement portion of the second end portion of the sleeve is greater than the third varying wall thickness of the intermediate portion of the sleeve and the first varying wall thickness of the first end portion of the sleeve. The reinforcement portion prevents buckling of the sleeve when it is forced into the die or into the connection body.

The first end portion of the sleeve includes a generally z-shaped in cross-section stepped inner bore comprising first and second gripping portions which include first and second inner circumferential biting edges. The first gripping portion includes first and second legs and the second gripping portion includes third and fourth legs. The first leg of the first gripping portion and the third leg of the second gripping portion terminate in the first sharp inner circumferential biting edge of the sleeve. The fourth leg of the second gripping portion and the inner bore of the intermediate portion of the sleeve terminate in the second sharp inner circumferential biting edge of the sleeve. The first and second sharp inner circumferential biting edges extend radially equidistantly into the tube when the sleeve interengages the tube.

The first leg and the second leg form an angle less than 90°. Similarly the third leg and the fourth leg form an angle less than 90°. The reinforcement portion includes an upper beveled edge portion. The exterior surface of the sleeve proximate the intermediate portion is slightly tapered. Similarly, the exterior surface of the sleeve proximate the first end portion is tapered.

The tube fitting is used in combination with a connection body. The first sharp inner circumferential biting edge of the first end portion of the sleeve includes a first diameter which interengages and bites into and through the exterior of the end portion of the thick-walled tube and into the wall portion of the end portion of the thick-walled tube without narrowing the passageway of the thick-walled tube. The second sharp inner circumferential biting edge of the first end portion of the sleeve includes a second diameter which interengages and bites into and through the exterior of the end portion of the thick-walled tube and into the wall portion of the end portion of the thick-walled tube without narrowing the passageway of the thick-walled tube.

The second varying wall thickness of the reinforcement portion of the second end portion of the sleeve is greater than the third varying wall thickness of the intermediate portion of the sleeve and the first varying wall thickness of the first end portion of the sleeve. A gland about the thick-walled tube is engageable with the sleeve and the gland includes exterior threads engageable with interior threads of the connection body. The exterior threads of the gland interengaging the interior threads of the connection body, coupling the tube, the tube fitting and the connection body together. The flared end of the thick-walled tube interengaging and sealing against the frusto-conical portion of the connection body.

Another process for making a tube fitting for use in combination with a thick-walled tube is disclosed. The thick walled tube includes a passageway therethrough defined by a cylindrically shaped interior surface and a second example of the sleeve is used in the fitting. The thick-walled tube includes a cylindrically shaped exterior surface, a wall portion, and, an end portion. The steps of the process include placing an end portion of a thick-walled tube into engagement with a die, the end portion of the thick-walled tube engages a surface of a tapered, generally cylindrical, wall of a guide rod of the die such that the interior surface of the tube interengages the tube engaging surface of the tapered, generally cylindrical wall of the guide rod of the die, and the thick-walled tube further engages a transitioning surface from the guide rod to the bottom of the die. The die is supported by a driving piston.

The process includes sliding a sleeve over the tube positioning the sleeve for compression into engagement with the thick-walled tube. The sleeve includes: a first end portion, an intermediate portion and a second end portion; an inner bore through the first end portion, the intermediate portion and the second end portion of the sleeve; the inner bore of the sleeve includes an interior surface; the sleeve includes an exterior surface; the first end portion of the sleeve includes a first varying wall thickness between the interior surface and the exterior surface of the sleeve proximate the first end portion; the second end portion of the sleeve includes a second varying wall thickness between the interior surface and the exterior surface of the sleeve proximate the second end portion; the intermediate portion of the sleeve includes a varying wall thickness between the interior surface and the exterior surface of the sleeve proximate the intermediate portion; the inner bore of the sleeve through the first end portion includes a first shoulder terminating in a first sharp inner circumferential biting edge; the inner bore of the sleeve through the first end portion includes a second shoulder terminating in a second sharp inner circumferential biting edge; and, the first sharp inner circumferential biting edge has a first diameter and the second sharp inner circumferential biting edge has a second diameter.

The process further includes the step of restraining, using a gland, the sleeve in position with respect to the sleeve and the die. Further, the process includes driving the die into the thick-walled tube and the sleeve with the driving piston flaring the end of the thick-walled tube and securing the sleeve into forceful engagement with the thick-walled tube. The die forces the first sharp inner circumferential biting edge into and through the exterior of the end portion of the thick-walled tube and into the wall portion of the end portion of the thick-walled tube without narrowing the passageway of the thick-walled tube. The first biting edge moves toward the tube and cuts into the wall of the tube as the die moves upwardly driven by the piston. The tube may initially slide upwardly as the end of the tube engages the transition surface from the guide rod to the bottom of the die. The die forces the second sharp inner circumferential biting edge into and through the exterior of the end portion of the thick-walled tube and into the wall portion of the end portion of the thick-walled tube without narrowing the passageway of the thick-walled tube. The exterior of the sleeve may be coated with an XADC-Armoloy® coating and etched before it is slid over the thick-walled tube. The inner diameter of the sleeve is slightly larger than the inner diameter of the thick-walled tube. The process may include applying a lubricant to the die prior to placing an end portion of a thick-walled tube into engagement with the die. The step of driving the die into the thick-walled tube continues until the top surface of the die abuts the bottom surface of the gland.

The step of driving the die into the thick-walled tube and the sleeve with the driving piston, flaring the end of the thick-walled tube, and securing the sleeve into forceful engagement with the thick-walled tube, includes forcing the first and second sharp inner circumferential biting edges into and through the exterior of the end portion of the thick-walled tube and into the wall portion of the end portion of the thick-walled tube equidistantly without narrowing the passageway of the thick-walled tube.

It is an object of the present invention to provide a high pressure fitting which does not obstruct the flow of liquid within the tube.

It is an object of the present invention to provide a joint that will not blow out under high pressure.

It is an object of the present invention to provide a fitting in combination with a connection body which is reliable and safe to operate under high pressure.

BRIEF DESCRIPTION OF THE DRAWINGS

FIG. 6 is a cross-sectional view of prior art U.S. Pat. No. 3,970,336 to O'Sickey.

FIG. 6A is a cross-sectional view of a prior art design.

FIG. 6B is an enlargement of a portion of FIG. 6A.

FIG. 15 is a schematic of the process for making the fitting.

DESCRIPTION OF THE INVENTION

Figure 1:
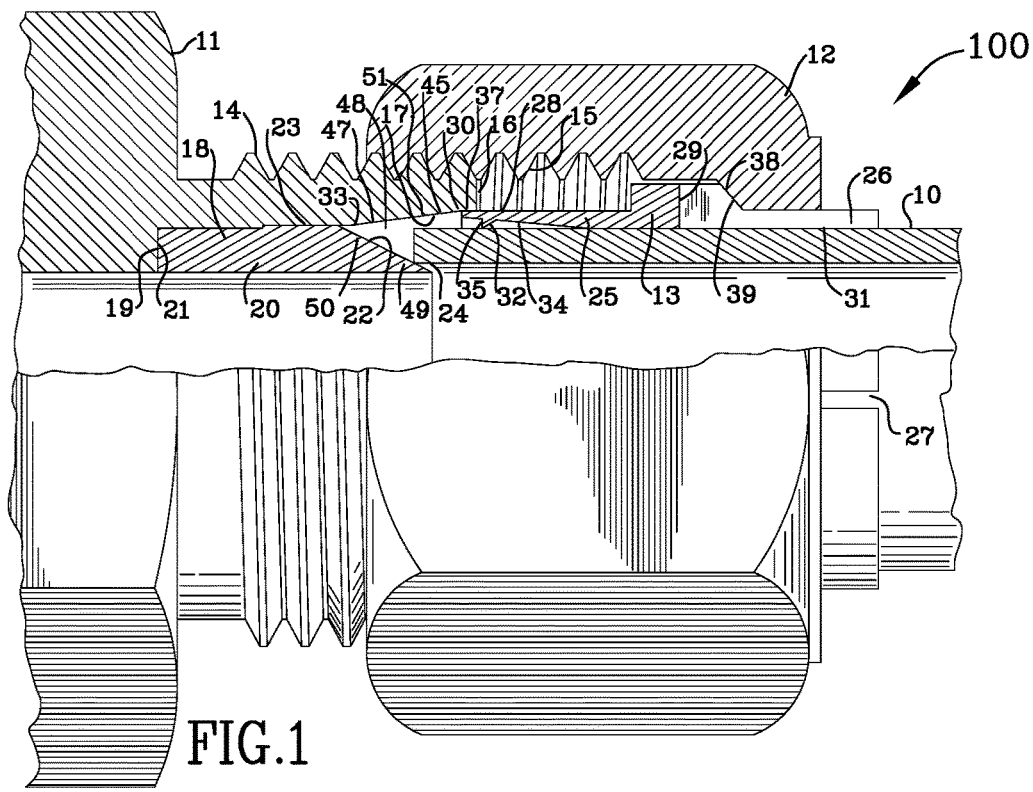
FIG. 1 is an enlarged side view of a tube coupling of prior art U.S. Pat. No. 2,850,202 to M. F. Bauer.
Figure 2:
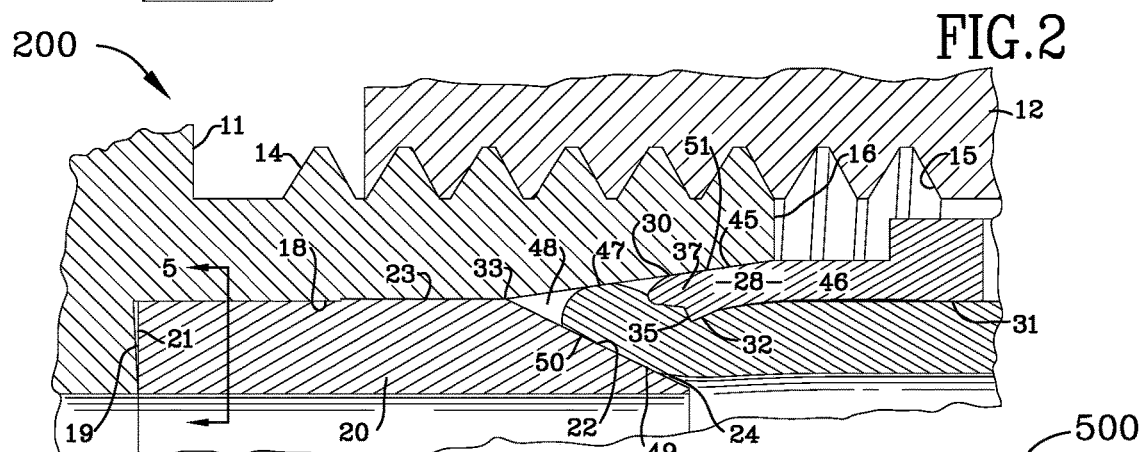
FIG. 2 is an enlarged and fragmentary cross-sectional view of the forward end portion of the sleeve shown in the prior art device illustrated in FIG. 1.
Figures 3, 4, 5:
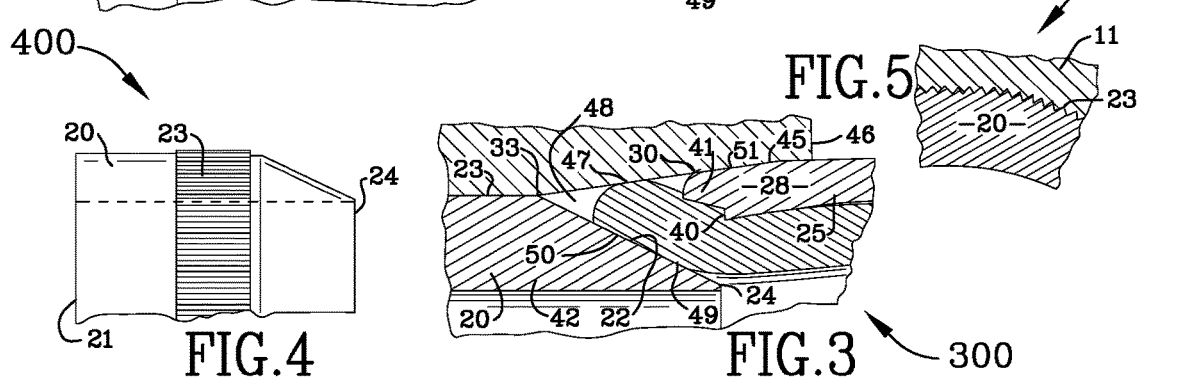
FIG. 3 is a modified form of the forward end portion of the sleeve illustrated in the prior art device illustrated in FIG. 2.
FIG. 4 is a fragmentary side view of the wedge insert illustrating the knurled outer surface portion.
FIG. 5 is a fragmentary side view taken along the lines 4-4 of FIG. 2 showing principally the knurled section.
Figure 7:
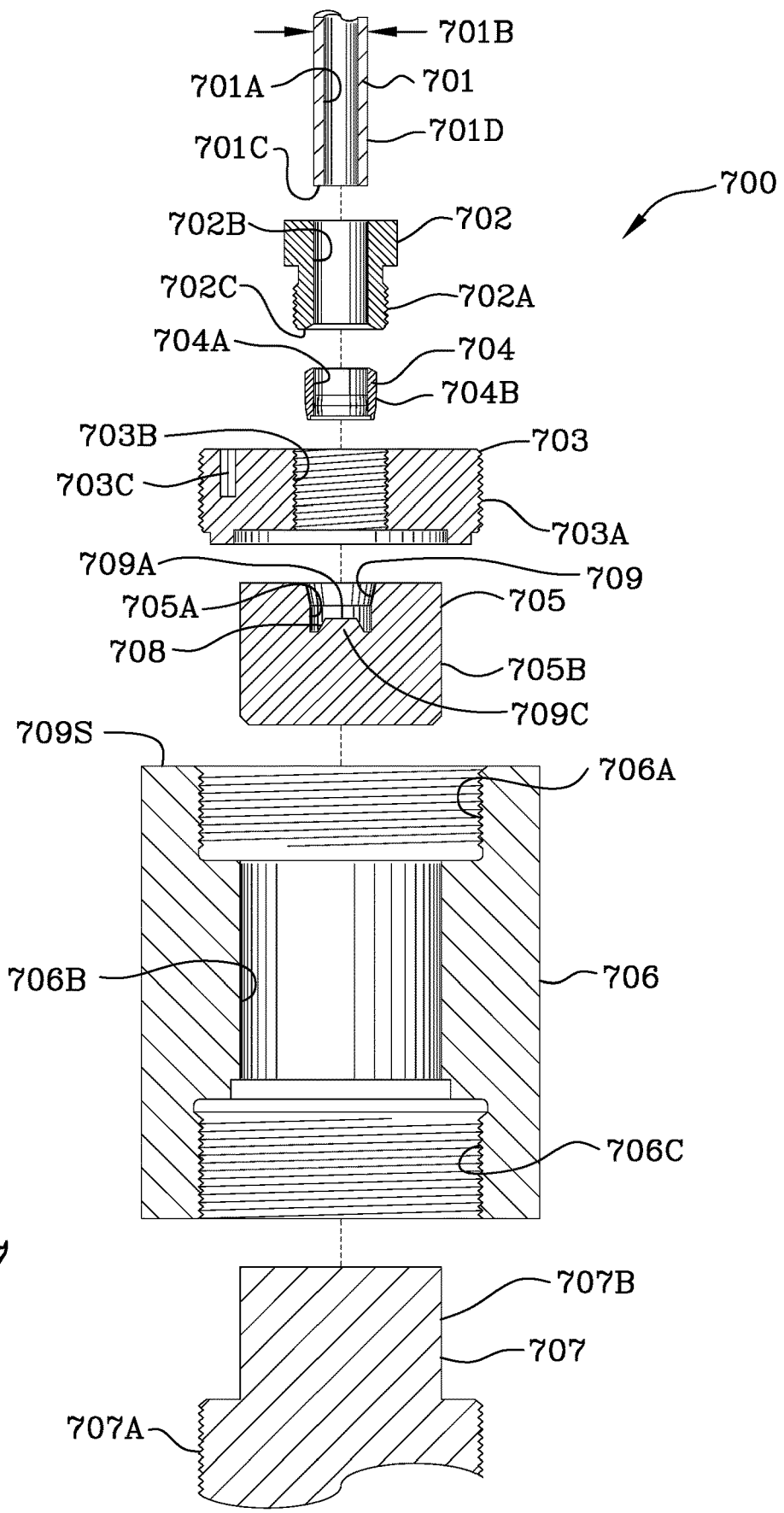
FIG. 7 is an exploded view of the apparatus for making the fitting.

FIG. 7 is an exploded view 700 of the apparatus for making the fitting illustrating: thick walled tubing 701, interior of the tubing 701A, exterior of the tubing 701D, width of the tubing 701B and the end of tubing 701C. Gland 702 includes exterior threads on gland 702A. Gland 702 includes an inner cylindrically shaped passageway 702B through which thick walled tubing 701 passes. Cap 703 includes exterior threads 703A which mate with interior threads 706A in the aluminum housing 706. Cap 703 is rotated with a rod (not shown) inserted into cap 703. Cap 703 further includes an annular recess into which the die 705 enters. Sleeve 704 includes an inner contoured surface 704A which is generally cylindrically shaped with a relief which facilitates bending and deforming the sleeve with pressure and force applied by the gland 702 as described hereinbelow. Die 705 includes a contoured interior 705A which includes a sleeve engaging tapered surface 709 which interengages the exterior 704B of the sleeve 704. Contoured interior 705A includes a sleeve engaging tapered inner wall 709 and a tube engaging tapered wall surface 708 of frusto-conically shaped flaring protrusion 709C.

Still referring to FIG. 7, die 705 includes a cylindrically shaped exterior surface 705B sized to slidably engage cylindrical passageway 706B of housing 706. Die 705 is somewhat analogous to a piston within a piston cylinder and movable therewith. Housing 706 includes a second set of internal threads 706C therein. Screwed hydraulic cylinder 707 includes a driving portion of the cylinder which slidingly engages the inner cylindrical passageway 706B of the aluminum housing 706. Exterior threads 707A on the screwed hydraulic cylinder 707 interengage interior threads 706C of the housing. A drive mechanism, which may be hydraulically or electrically driven, rotates piston 707.

Figure 8:
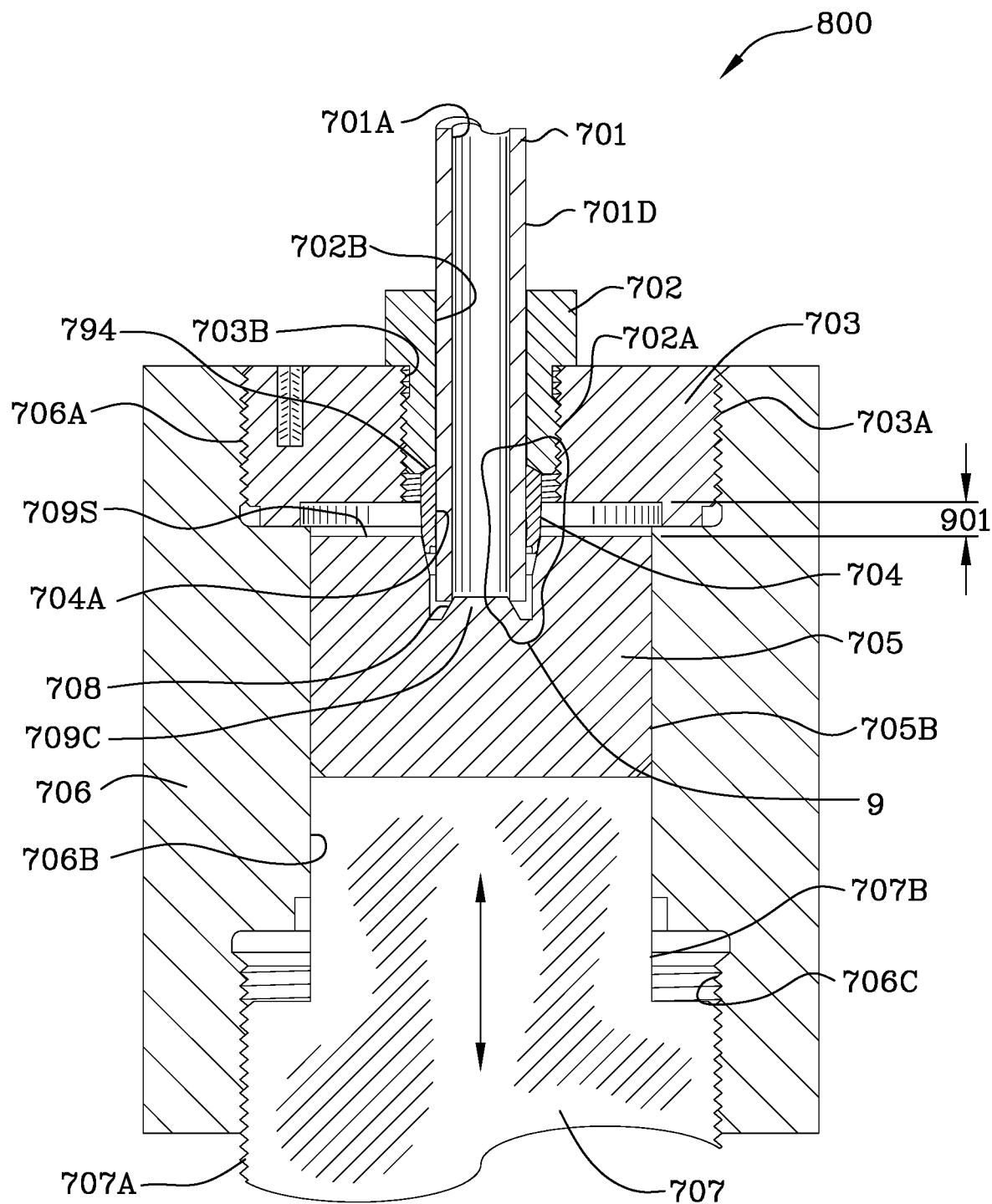
FIG. 8 is a cross-sectional view of the apparatus for forming the fitting assembled.
Figures 9, 9A:
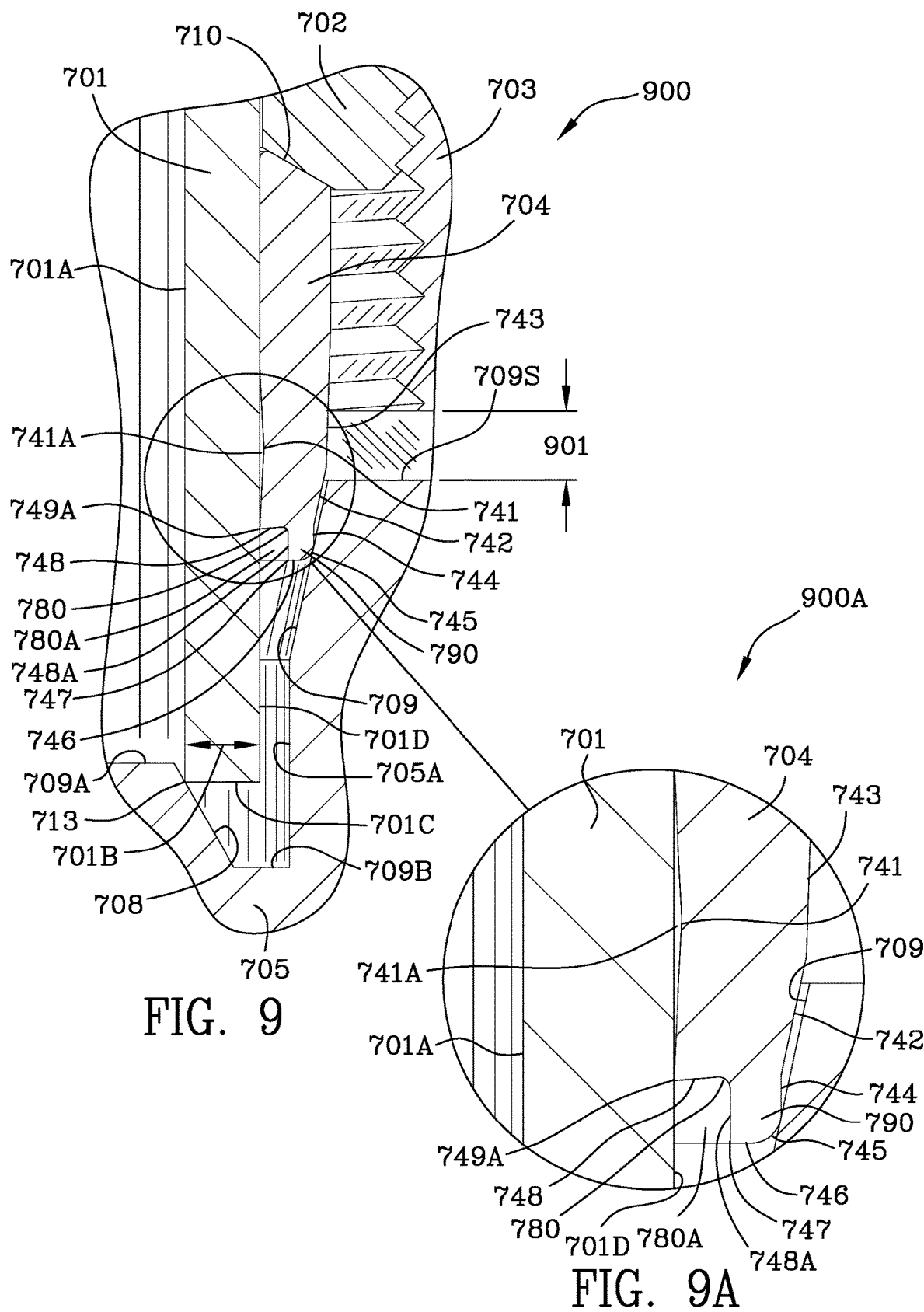
FIG. 9 is an enlarged portion of FIG. 8 illustrating the die in a first position.
FIG. 9A is an enlarged portion of FIG. 9.

Still referring to FIG. 7, plateau 709A of the frusto-conically shaped flaring protrusion 709C resides as described hereinbelow within the inner diameter of thick-walled tubing 701 as illustrated in FIGS. 8 and 9. FIG. 8 is a cross-sectional view 800 of the apparatus for forming the fitting assembled. FIG. 9 is an enlarged portion 900 of FIG. 8 illustrating the die 705 in a first position before the die begins moving upwardly under the force of the screw type hydraulic cylinder. Gap 901 is illustrated in FIG. 9 and represents the spacing between the die 705 and the cap 703. It will be noticed in FIG. 9 that the inner wall 701A of the thick walled tube 701 includes an inside of the end portion 713 of the tube in engagement with the tube engaging tapered wall surface 708 of frusto-conically shaped flaring cone/protrusion 709C. As illustrated in FIG. 9 tube 701 sits in engagement with surface 708 of the frusto-conically shaped flaring cone/protrusion 709C without any force other than gravity applied thereto. FIGS. 8 and 9 illustrate the flat bottom inner portion of die 709B and the plateau 709A of the frusto-conically shaped flaring cone 709C of the die 705.

Figure 7A:
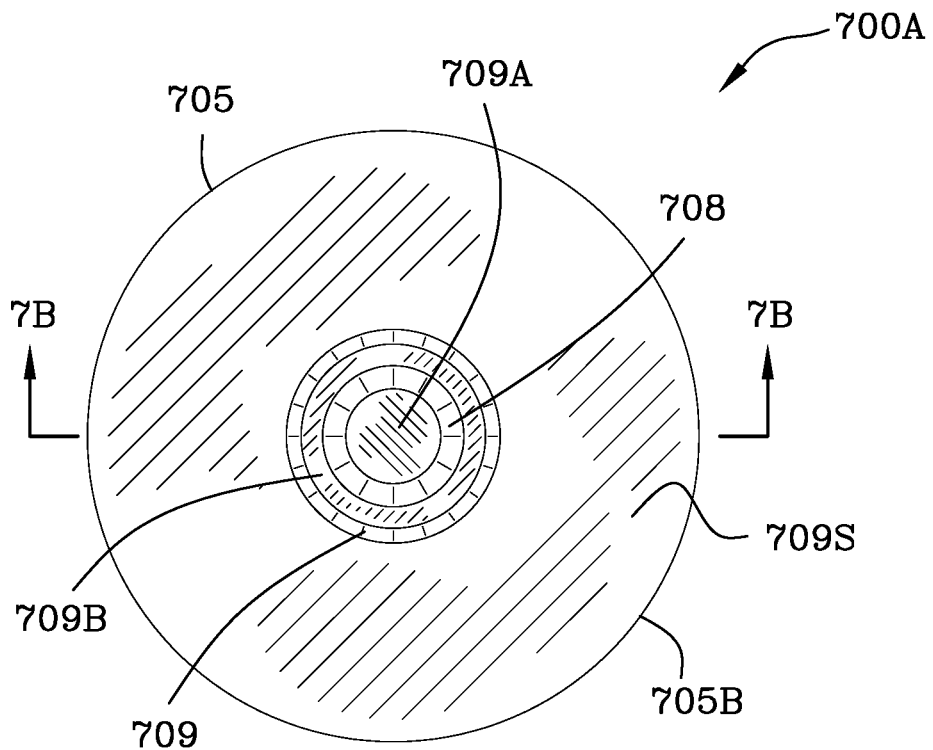
FIG. 7A is a top view of the die.
Figure 7B:
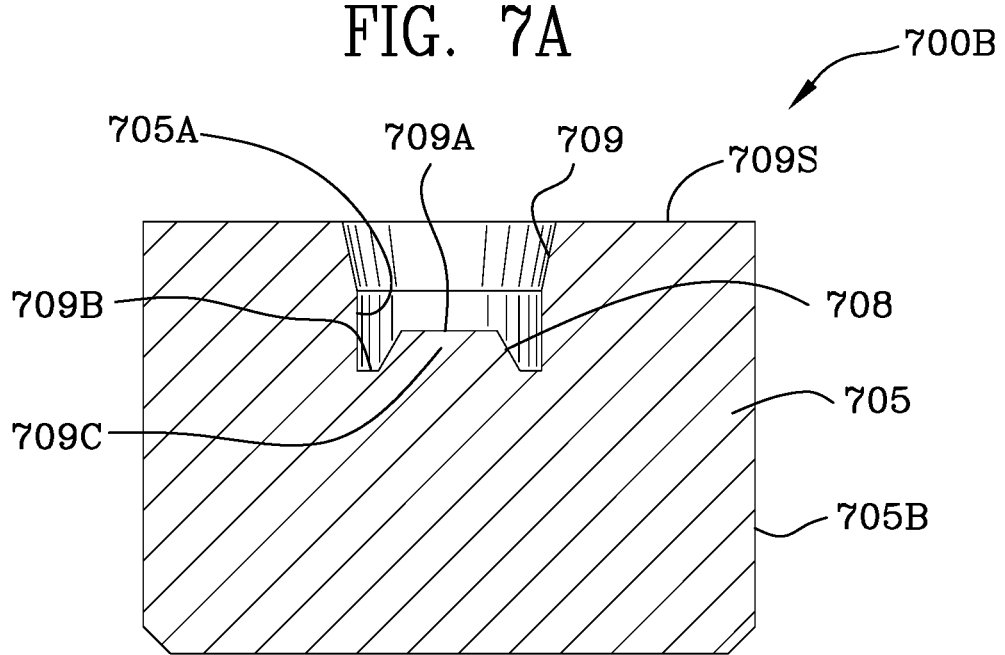
FIG. 7B is a cross-sectional view of the die taken along the lines 7B-7B.

FIG. 7A is a top view 700A of the die and FIG. 7B is a cross-sectional view 700B of the die taken along the lines 7B-7B. Upper surface 709A of die 705 is illustrated in FIGS. 7A and 7B and this surface engages cap 703 when the die is driven upwardly. Referring to FIGS. 8 and 9, reference numeral 710 represents the interengagement between gland 702 and sleeve 704.

Figures 10, 10A:
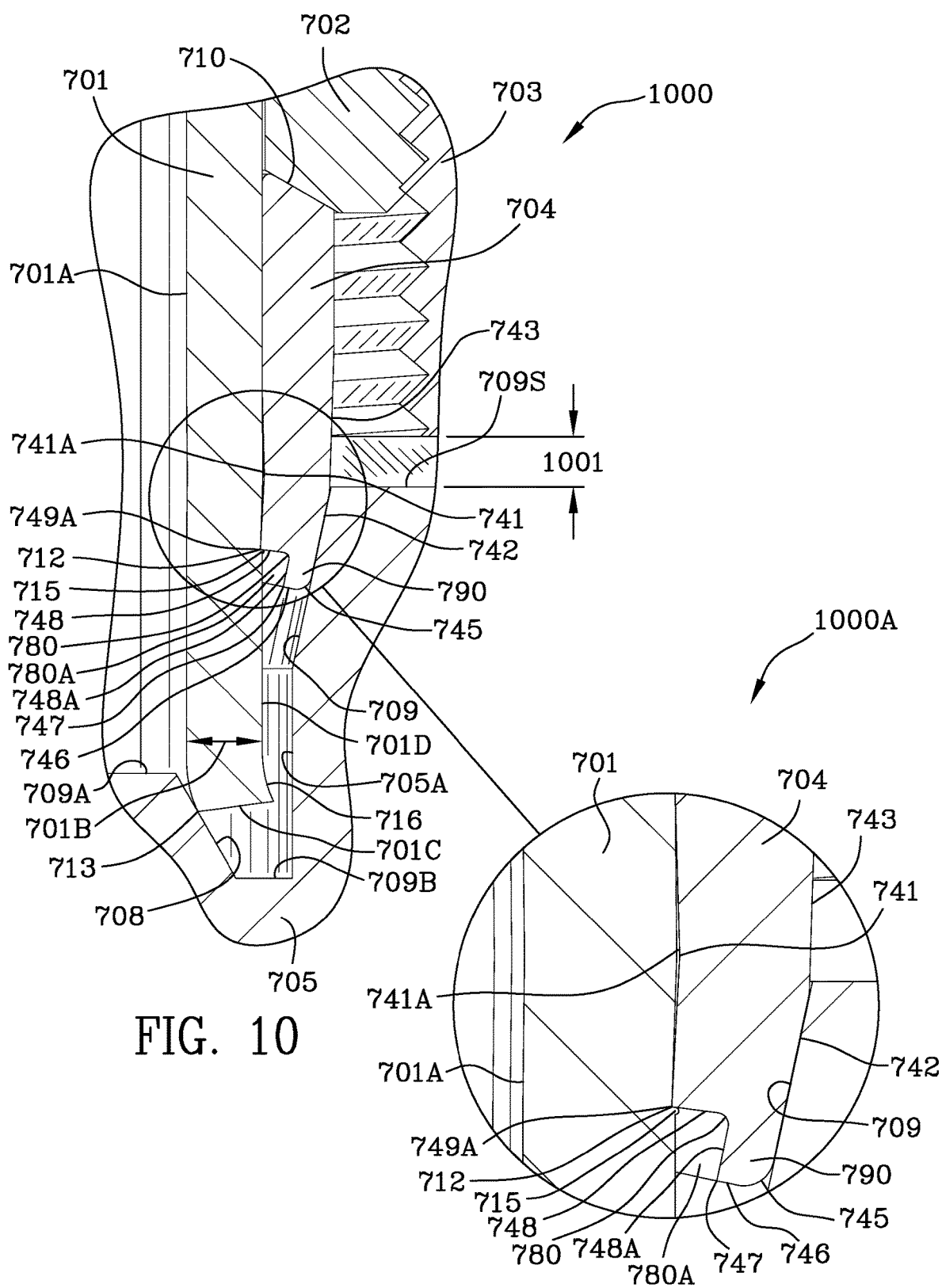
FIG. 10 is a view similar to FIG. 9 with the die in a second position.
FIG. 10A is an enlarged portion of FIG. 10.
Figures 11, 11A:
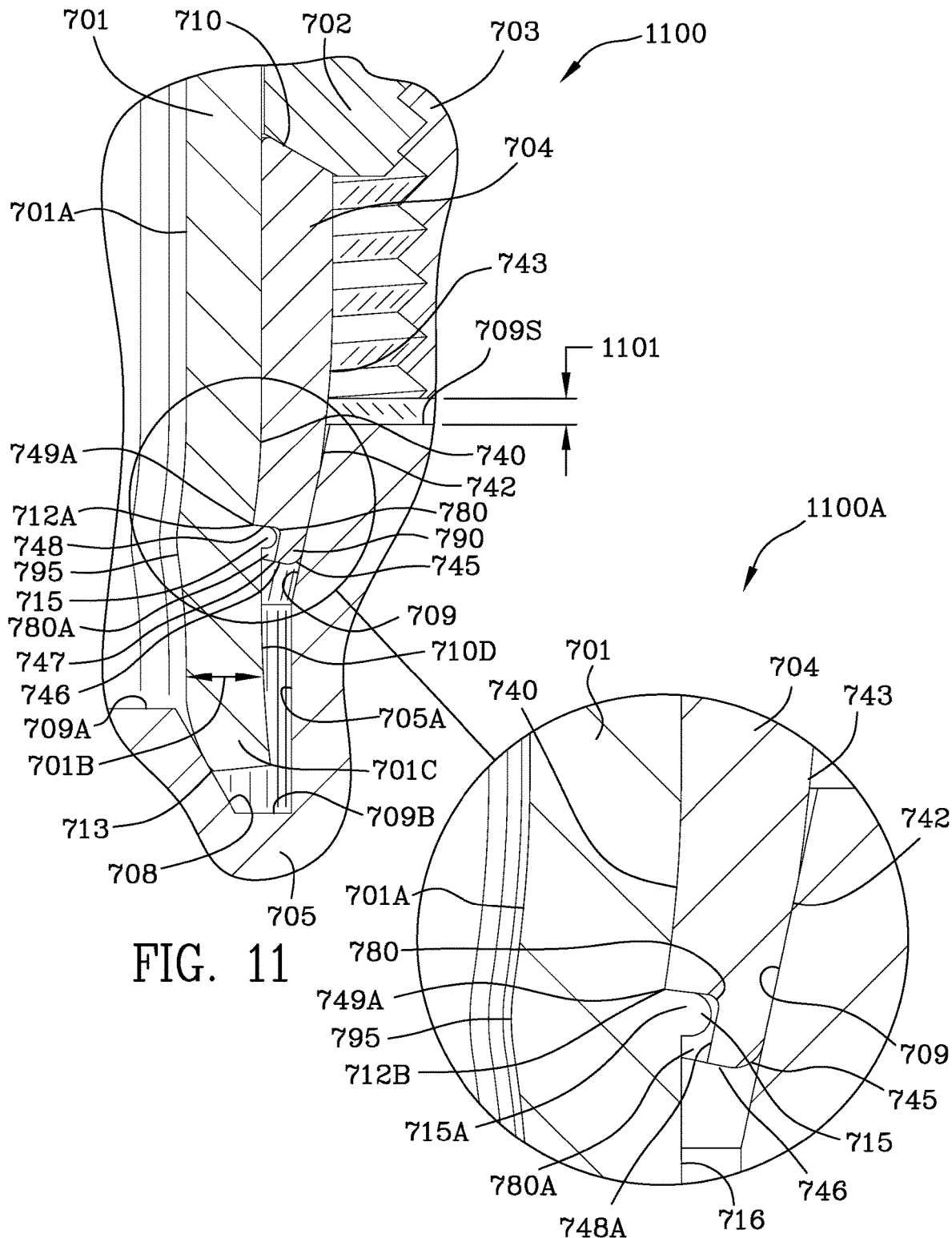
FIG. 11 is a view similar to FIG. 10 with the die in a third position.
FIG. 11A is an enlarged portion of FIG. 11.
Figures 12, 12A:
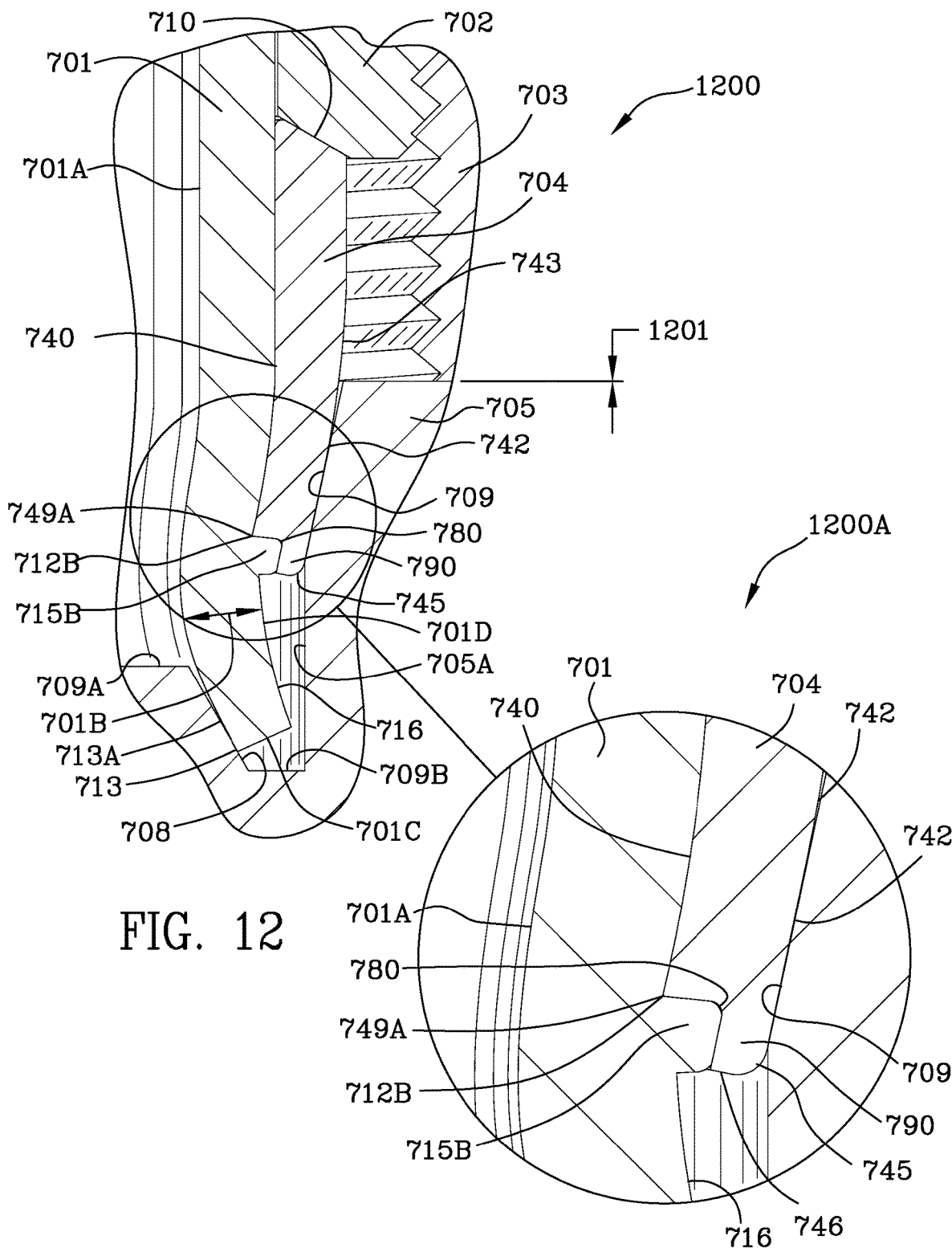
FIG. 12 is a view similar to FIG. 11 with the die in fourth position abutting the cap.
FIG. 12A is an enlarged portion of FIG. 12.

FIG. 15 is a schematic 1500 of the process for making the fitting in combination with a thick-walled tube 701. The process includes placing a thick-walled tube 701 into engagement with the tube engaging tapered wall surface 708 of frusto-conically shaped flaring cone 709C such that the inner diameter 701A, 713 of the tube interengages the surface 708 of the frusto-conical portion of the die. The die, as previously stated, is supported by a driving cylinder 707 and is driven thereby. Next, the process includes sliding the sleeve 704 over the thick-walled tube 701 wherein the sleeve includes an interior and an exterior. The exterior of the sleeve is etched and has an XADC-Armoloy® coating thereover. The sleeve 704 includes a sharp annular biting portion engaging the thick-walled tube. The sleeve 704 includes an interior annular symmetric concavity and the concavity of the sleeve interengages the thick-walled tube. Next, the step of securing the sleeve into forceful engagement with the die is performed by raising or lifting the die. The step of driving the die into the thick-walled tube and the sleeve with the driving piston is performed simultaneously flaring the end portion of the thick-walled tube. Simultaneously the step of deforming the sleeve into engagement with the thick-walled tube 1505 is performed. The step of driving the die into the thick-walled tube includes forcing and engaging the sharp annular biting portion with the thick-walled tube deforming the tube into engagement with the recess in the extended lip. The driving cylinder raises the die in a continuous motion toward the cap and into engagement therewith. FIGS. 9-12 illustrate the die in different positions with respect to the stationary cap. FIG. 9 represents the position of the die before it is moved upwardly and FIG. 12 represents the position of the die when it has been moved fully upwardly and engages the cap. FIGS. 10 and 11 represent intermediate positions between the extremes illustrated in FIGS. 9 and 12.

Figure 7C:
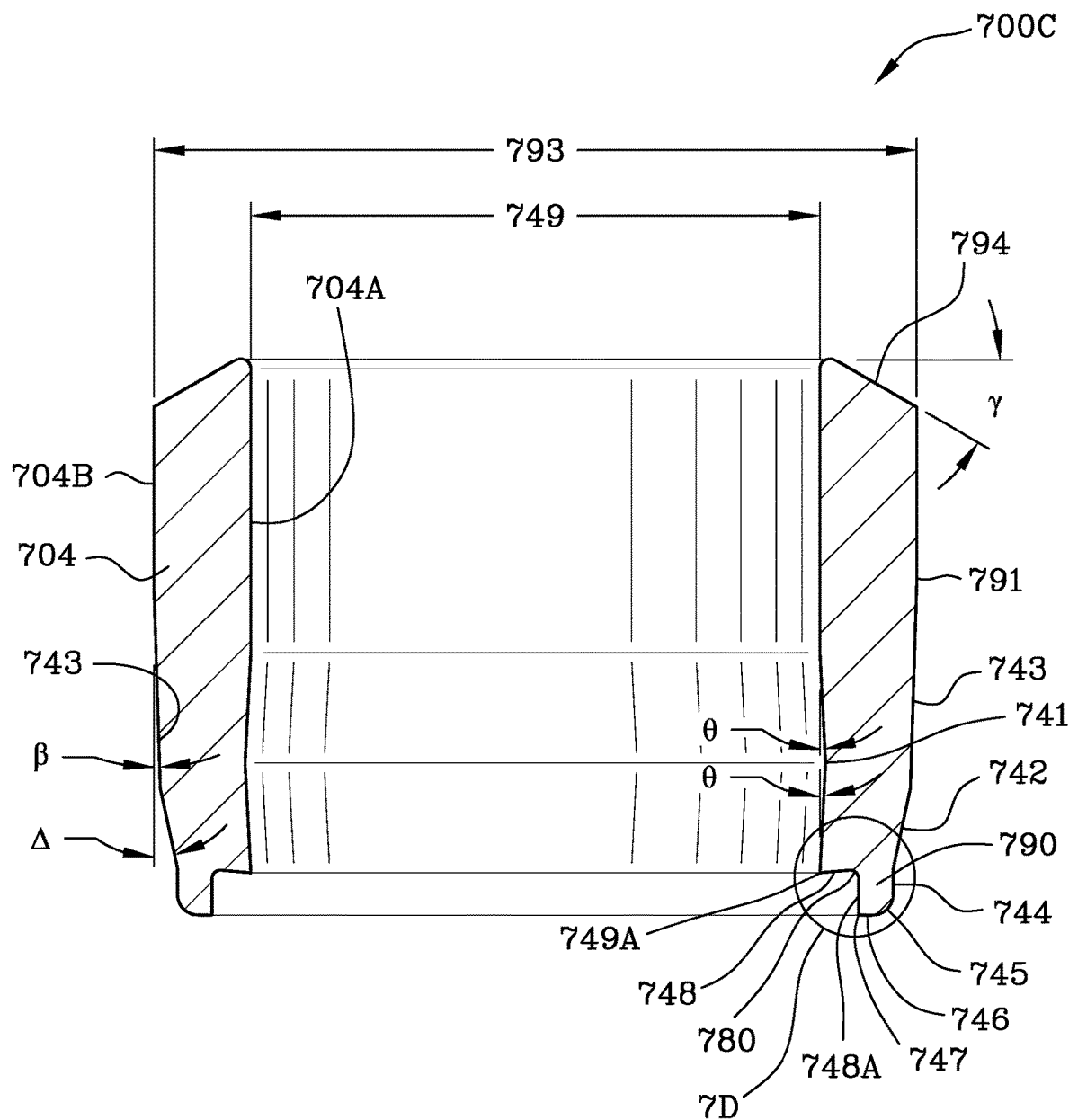
FIG. 7C is an enlarged cross-sectional view of the sleeve.
Figure 7D:
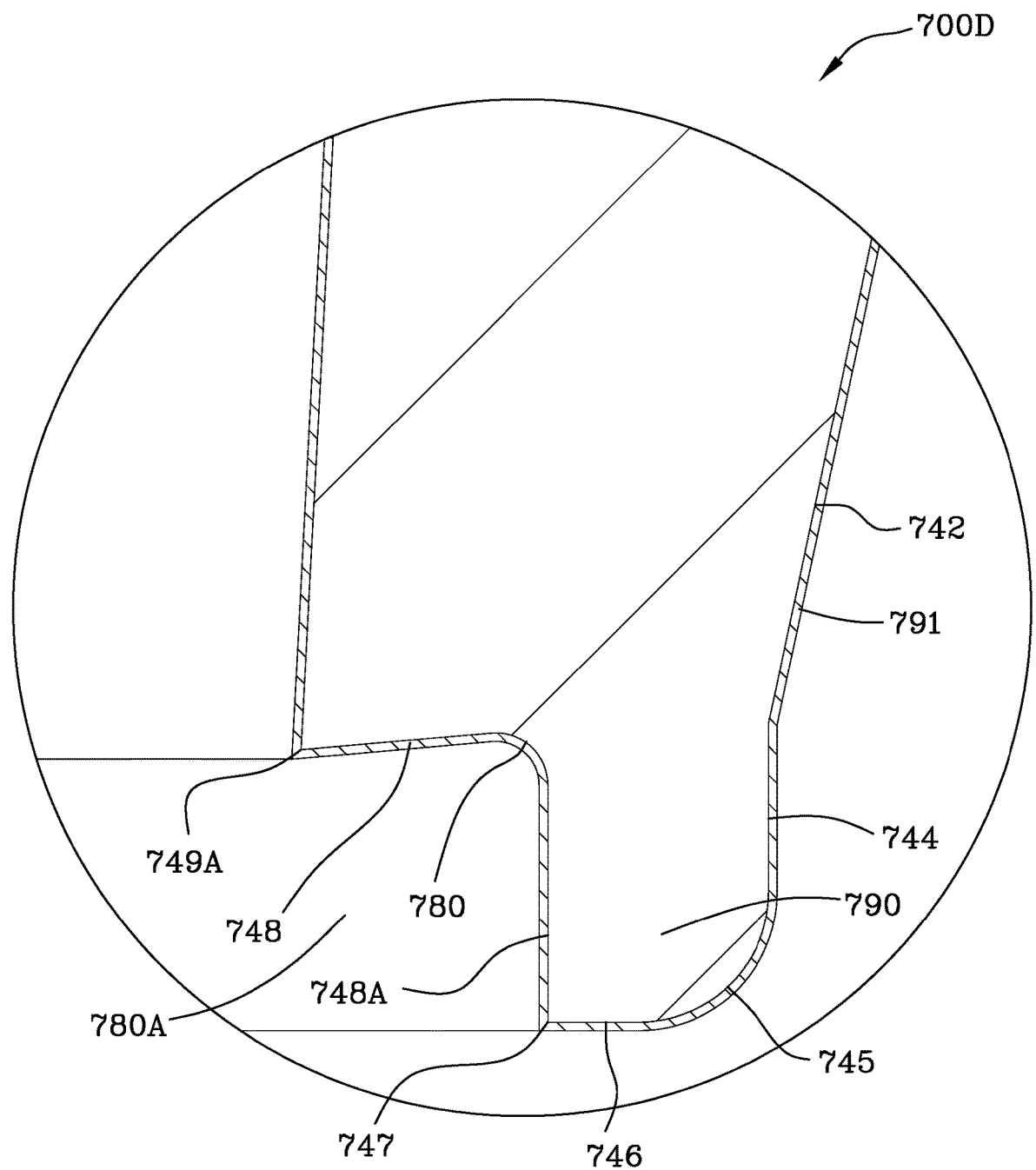
FIG. 7D is an exaggerated cross-sectional schematic view of a portion of the sleeve illustrating details of construction including the coating.
Figure 7E:
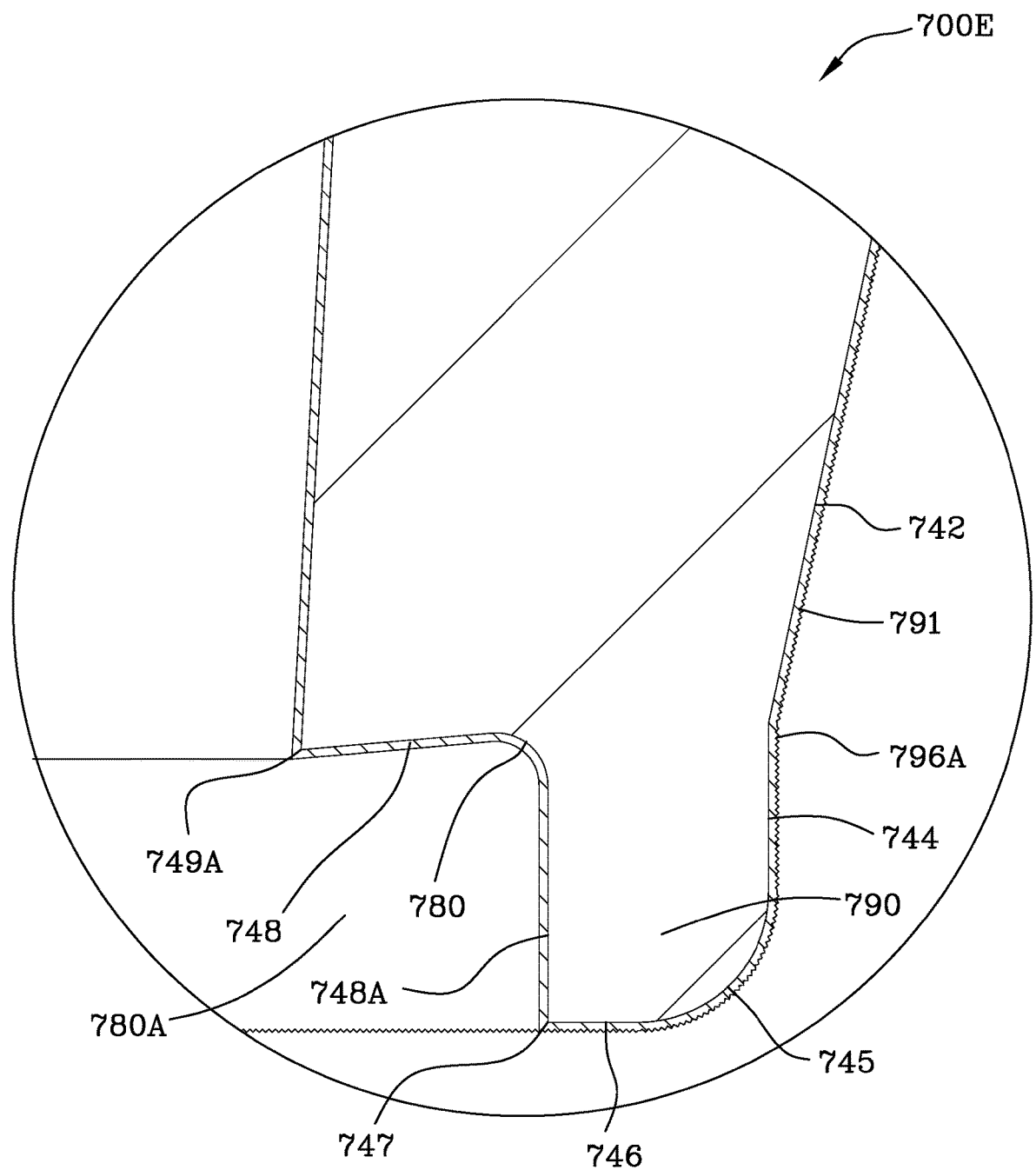
FIG. 7E is an enlargement of a portion of FIG. 7D.

FIG. 7C is an enlarged cross-sectional view 700C of the sleeve. By way of example, nominally the sleeve 704 has an inner diameter 749 of approximately 0.560 inches and an outer diameter 793 of 0.750 inches. The approximate length of sleeve 704 is 0.548 inches. FIG. 7D is a schematic, exaggerated and enlarged cross-sectional schematic view 700D of a portion of the sleeve illustrating details of construction including the XADC Aramaloy coating 791. By exaggerated it is meant that the coating is actually only 0.0003 to 0.0006 inches thick and would not be seen if drawn to scale, therefore, the thickness of the coating is exaggerated relative to its actual size so that it may be seen. In FIG. 7D the coating 791 is drawn to be approximately 3 times actual scale. FIG. 7E is an enlargement 700E of a portion of FIG. 7D.

Reference numeral 741 defines an inner concavity in the sleeve 704. The angle θ defines the concavity or relief 741 and measures about 3°. Inner concavity or relief 741 is symmetric as viewed in FIG. 7C. Generally the interior or inner surface 704A of the sleeve is cylindrically shaped and includes the relief 741 just described. Sleeve 704 is includes an XADC-Armoloy® coating 791 thereover which includes synthetic nanodiamonds particles having a Rockwell Hardness of 98. Sleeve 704 is chemically etched using an acid. The extended lip portion 790 of the sleeve is also chemically etched as best illustrated in FIG. 7E. FIG. 7E is an enlargement 700E of a portion of FIG. 7D. Reference numeral 796A illustrates a jagged line representative of the chemically etched coating on the exterior surface of the sleeve. Coating 791 generally follows the contour of the sleeve forming an outer surface which is smooth before it is chemically etched forming a rough surface 796A. The wall thickness of the sleeve is nominally 0.095 inches as illustrated in FIG. 7C. The exterior 704B of the sleeve is tapered (first taper 743, second taper 742) as illustrated by angles β (1.787°) and Δ (12°±1°). Radially curved portion 745 of the sleeve 704 initially engages the die when the sleeve is positioned as shown in FIGS. 8 and 9 (i.e., before die 705 applies upward force on the sleeve and tube). Reference numeral 741A represents the gap between the wall/concavity 741 of the sleeve and the tube 704. Upper beveled edge portion 794 of the sleeve 704 makes a 30° angle γ with respect to the horizontal and interengages a correspondingly angled surface 702C of the gland 702. Surface 702C of the cold worked 316 stainless steel gland is coated with baked on Molykote (molybdenum disulfide) so as to facilitate rotation of the gland with respect to the sleeve 704 when the compression fitting/flare fitting of the instant invention is used with the connection body.

Referring to FIGS. 7C and 7D, the exterior end portion 744, the end of the sleeve 746, edge of the sleeve 747 and the annular sharp biting edge 749A are illustrated. The inner concavity 780 is formed by first 748 and second 748A legs which form an angle of less than 90°.

Referring to FIGS. 9-13, reference numeral 780A denotes a space which is progressively filled with metal from the tube as the annular sharp biting edge 749A proceeds deeper into the wall of the tube as the die 705 is forced upwardly.

FIG. 8 is a cross-sectional view 800 of the apparatus which forms the compression fitting/flare fitting. FIG. 8 illustrates the elements of FIG. 7 in the assembled state or condition. Gap 901 between the die and the cap 703 is illustrated and represents the spacing therebetween before the die is urged toward the cap. Gland 702 is illustrated in FIG. 8 as being fully threaded within cap 703 and in engagement with sleeve 704. Gland 702 may be differently sized, for instance, it may have a different length or diameter and it may not bottom out on the cap 703. Many examples of the arrangement of the elements illustrated in FIG. 8 are specifically envisioned. The arrow in FIG. 8 is meant to convey that the piston 707 may be driven in the upward or downward direction.

FIG. 9 is an enlarged portion 900 of FIG. 8 illustrating the die 705 in a first position and before the die begins moving upwardly. FIG. 9A is an enlarged portion 900A of FIG. 9. FIGS. 8, 9 and 9A represent the state of the die, tube and sleeve before upward force is applied by the die/hydraulic piston/cylinder. FIGS. 8 and 9 illustrate the upper surface 709S of the die and a gap 901 is illustrated between the upper surface 709S of the die 705 and the cap 703. FIG. 9A illustrates the legs 748, 748A which together with the thick-walled tube 701 define the cavity 780. Space 780A represents an annular volume which is filled with metal formed by the compression fitting and tube flaring operation. As illustrated in FIG. 9A, initially the annular sharp biting edge 749A is resting in engagement with the outer surface 701D of the tubing and has not yet been forced into cutting and extruding engagement with the tube. The radially curved portion 745 of the exterior surface of the sleeve is illustrated in FIGS. 9 and 9A engaging the sleeve engaging surface 709 of the die 705. The die 705 illustrated in FIG. 9 is spaced apart from the cap 703 as represented by reference numeral 901.

FIG. 10 is a view 1000 similar to FIG. 9 with the die 705 in a second position. The second position is indicated by gap 1001 which is smaller than the gap 901 revealing that the die 705 has progressed upwardly. FIG. 10 illustrates end 701C of the tube beginning to flare. FIG. 10A is an enlarged portion 1000A of FIG. 10 illustrating the annular sharp biting edge 749A engaging the tube 701 forming an annular cut 712 beginning to form in the exterior surface 701D of the thick-walled tubing and which extrudes metal of the tube into cavity 780 occupying space 780A. As the die 705 is moved upwardly, the sleeve 704 is compressed by the die as the sleeve engaging surface 709 is brought into engagement with the second tapered surface 742 of the exterior of the sleeve. FIGS. 10 and 10A illustrate that the gap 741A illustrated in FIG. 9A is smaller in FIG. 10A as the relief defined by reference numeral 741 is compressed. The sleeve includes an extended lip portion 790 (overhanging nose) with a radius 745 that prevents the hardened surface 701D of the sleeve (i.e. the XADC-Armoloy® coating) from damaging the tapered surface 709 of the die 705. Before the die 705 begins its upward movement under the force of the hydraulic screw piston 707, a cavity 780 exists between the extended lip portion 790 of the sleeve 704 and the tube 701. The first and second tapered exterior surfaces 743, 742 of the sleeve are deformed to substantially match the sleeve engaging tapered inner wall 708 of the die 705. Simultaneously therewith the annular biting edge 749A of the sleeve 704 begins to penetrate the tube surface 701D and begins forcing the annular inside corner 713 of the tube 701 against the respective tube engaging taper surface 708 of the frusto-conically shaped protrusion/cone 709C of the die 705. The relief 741 in sleeve 704 in combination with a hardened annular biting edge 749A of the sleeve 704 (for example, the sleeve with XADC-Armoloy® coating which increases the surface hardness) allows penetration of the tube. As the die 705 continues to move upwardly toward the cap 703, the sleeve engaging tapered inner wall 709 of the die forces the annular biting edge 749A of the sleeve deeper into the tube 701 deforming (extruding) the tube material and simultaneously causes the annular inside corner 713 of the tube end to be deformed and flare outwardly. The relief angle θ in combination with the angle of leg 748 with respect to horizontal as illustrated in FIG. 7C in combination with the XADC-Armoloy® coating provides the ability to cut and extrude the metal of the tube so as to occupy space 780A.

FIG. 11 is a view 1100 similar to FIG. 10 with the die in a third position as indicated by the gap 1101 which is smaller than gap 1001 illustrated in FIG. 10. Gap 1001 reveals that die 705 has progressed upwardly further than in FIGS. 10 and 10A. FIG. 11A is an enlarged portion 1100 of FIG. 11 and illustrates the annular sharp biting edge 749A engaging tube 701 forming a yet deeper annular cut 712A in the exterior surface 701D of the thick-walled tubing 701 as compared to the annular cut 712 of FIGS. 10 and 10A. FIG. 11 illustrates the extrusion of metal from the tube 701 into cavity 780 occupying space 780A. As the die 705 is moved upwardly, sleeve 704 is compressed by the die 705 and the inner surface 701A of the tubing deforms as indicated by an inward bulge 795 as shown in FIGS. 11 and 11A. FIGS. 11 and 11A illustrate that the gap 741A between the exterior tube wall 701D and the concavity 741 of the sleeve illustrated in FIGS. 9A and 10A is nonexistent as the relief/concavity 741 was further compressed and the interior surface 704A of the sleeve 704 and the exterior surface of the thick-walled tube 701D engage as indicated by reference numeral 740.

FIG. 12 is a view 1200 similar to FIG. 11 with the die 705 in fourth and final position abutting and engaging the cap 703. FIG. 12A is an enlarged portion 1200A of FIG. 12. When the die 705 engages cap 703, metal from the tube has been extruded into the cavity 780 and space 780A filling same. Cavity 780 is defined by extended lip portion 790 of the sleeve 704 and the tube 701D. Simultaneously with the extrusion of tube metal to fill concavity 780A as viewed in FIG. 11, tube end 701C is flared out to a diameter larger than the inside diameter of the sleeve 704.

Figure 13:
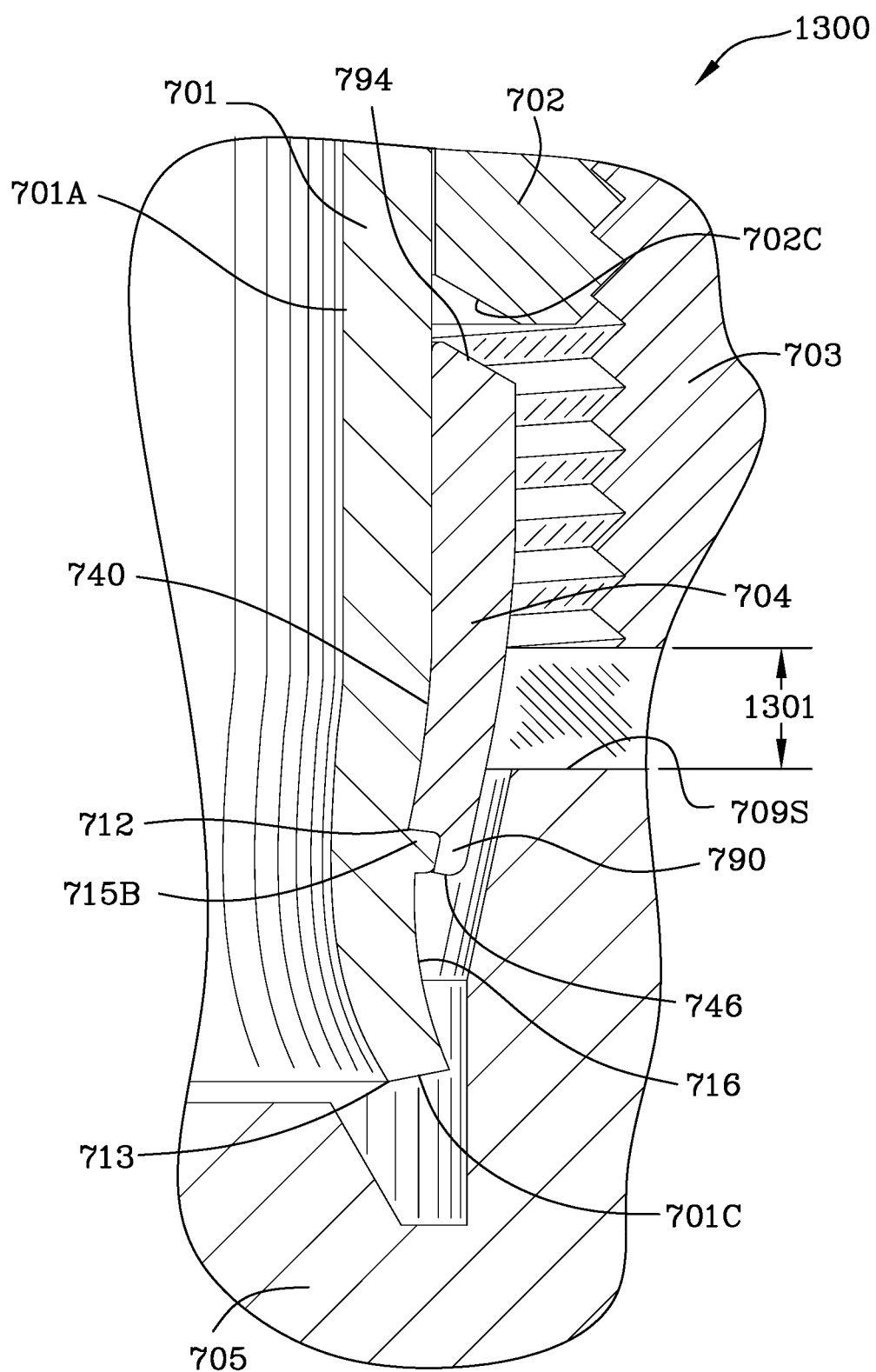
FIG. 13 is a view similar to FIG. 12 with the die in the process of being extracted away from the cap.

Pressure is then vented from the hydraulic cylinder and then the gland 702, sleeve 704 and tube 701 are removed by unthreading the gland from the cap 703. FIG. 13 is a view 1300 similar to FIG. 12 with the die in the process of being extracted away from the cap as illustrated by gap 1301. As the hydraulic cylinder is vented, the die 705 is withdrawn and the sleeve 704 is separated from the sleeve engaging surface 702C of the gland 702 as illustrated in FIG. 13.

Figure 14:
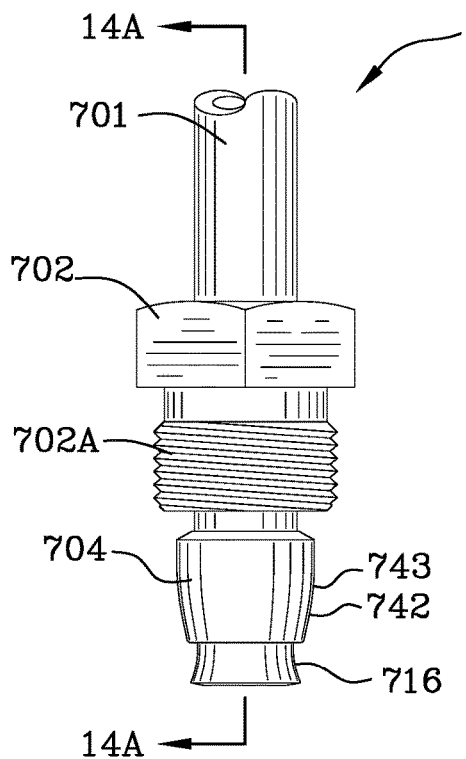
FIG. 14 is a front view of the fitting after assembly.
Figure 14A:
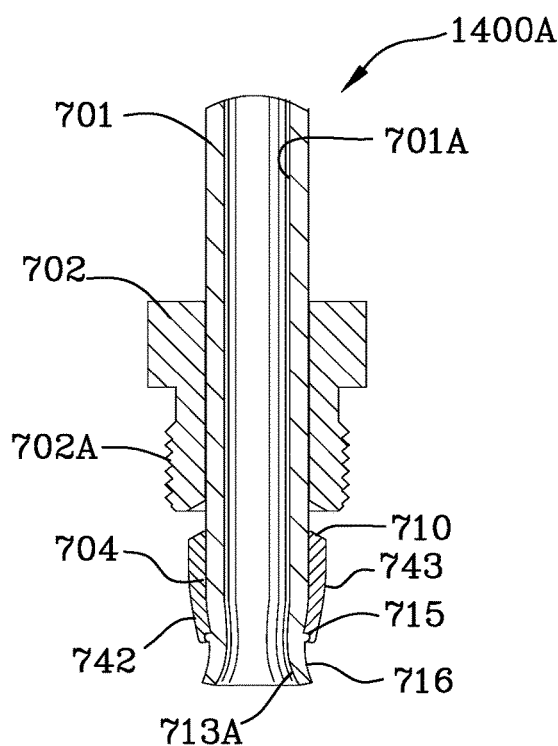
FIG. 14A is a cross-sectional view of the fitting of FIG. 14 taken along the lines 14A-14A.

The fitting assembly and flared tube end is now ready for final assembly into its matching connection body as illustrated in FIGS. 14, 14A, 14B, 14C and 14D. FIG. 14 is a front view 1400 of the fitting after it has been completed by the process and apparatus of FIGS. 8-15. FIG. 14A is a cross-sectional view 1400A of the fitting of FIG. 14 taken along the lines 14A-14A and illustrates the gland 702 surrounding the tube 701 with the gland spaced apart from the sleeve 704 for clarity. The person assembling the device can visually inspect the fitting to determine if the sleeve has not engaged the tube correctly by examining the flared end. Since the flaring of the tube end and the compression fitting of the sleeve are integrally related and occur simultaneously, it is not possible to achieve the proper flaring of the tube end if the compression fitting is not formed properly. With most high pressure compression fittings it is not possible to make visual inspections to determine if the mechanical bite was made correctly. The only way to determine if those fittings were made correctly was to test them. In the instant invention, however, were the compressive bite of the sleeve to fail through a fracture of the extruded metal, the flared tube end of the invention would not pass through the sleeve thus preventing ejection of the tubing. Tube ejection is a common failure mode of incorrectly made compression fittings and has the potential to cause serious injury.

Figure 14B:
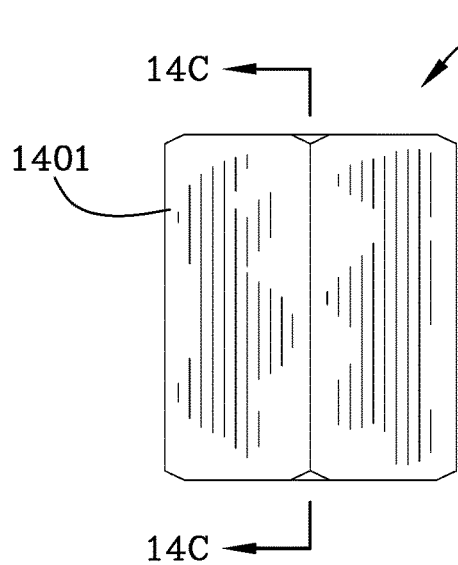
FIG. 14B is a front view of the connection body.
Figure 14C:
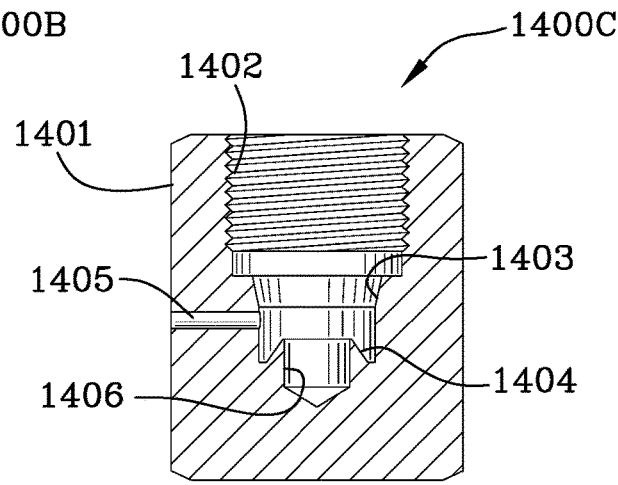
FIG. 14C is cross-sectional view of the connection body taken along the lines 14C-14C of FIG. 14.
Figure 14D:
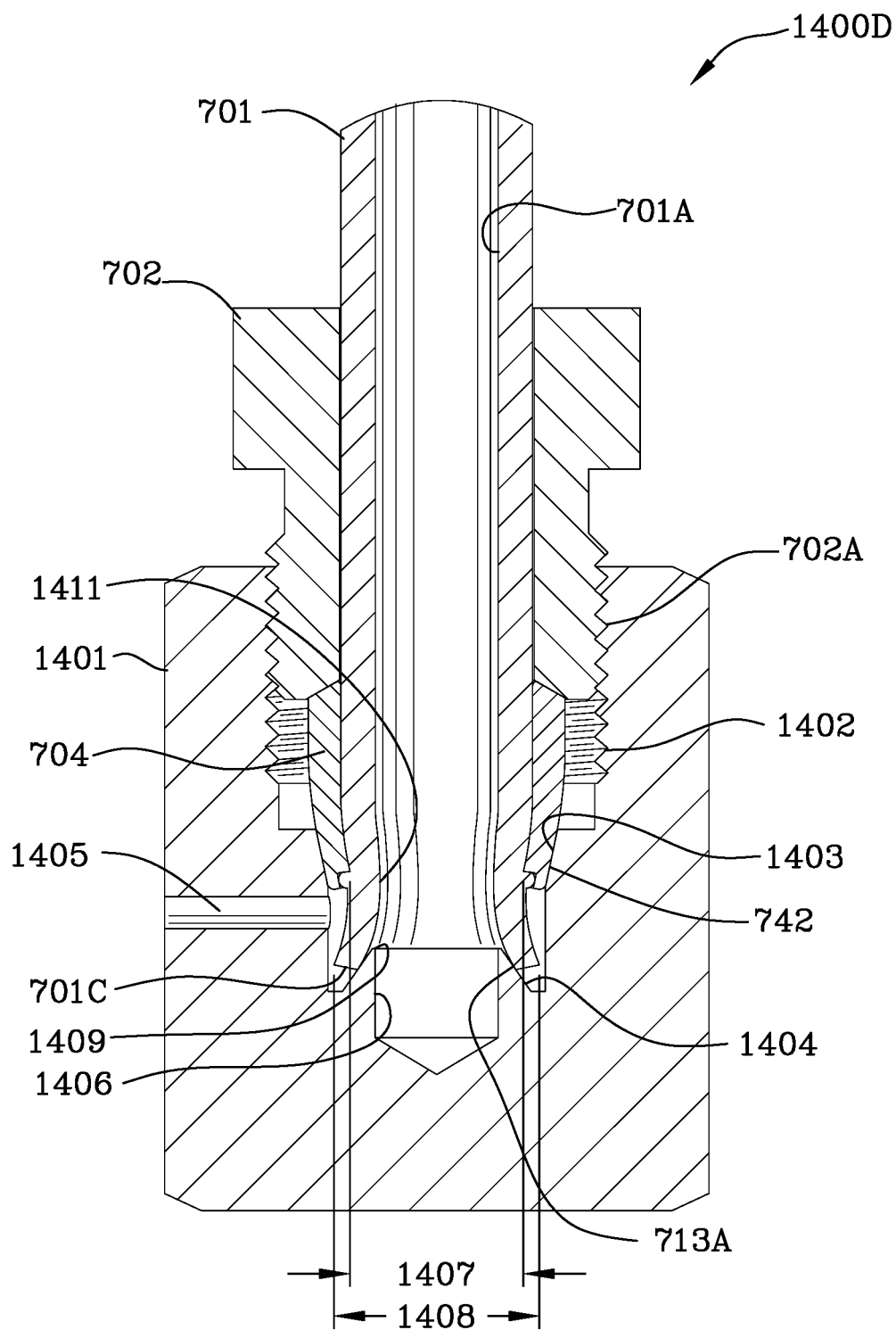
FIG. 14D is an enlarged cross-sectional view of the fitting secured to the connection body.

FIG. 14B is a front view 1400B of the connection body 1401. FIG. 14C is cross-sectional view 1400C of the connection body taken along the lines 14C-14C of FIG. 14 illustrating internal threads 1402 for mating with external threads 702A of the gland, sleeve engaging surface 1403, and frusto-conical surface of the mating body 1404. The geometry of the engaging surfaces 1403 and 1404 of the connection body may be identical to those of die 705 illustrated in FIGS. 8-13. A bleed port 1405 in connection body 1401 may be used to determine leaks. FIG. 14D is an enlarged cross-sectional view 1400D of the compression fitting/flared tube end combination secured to the connection body 1401 with interengagement of the threads 702A/1402. Since the flared end 701C of the tube has an outside diameter 1408 larger than the inner diameter 1407 of the sleeve as illustrated in FIG. 14D, the tube may not be extracted therefrom. Reference numeral 1406 illustrates the counterbore or flow path of the frusto-conically shaped structure 1409 in the connection body.

If the flare end of the tube does not seal correctly there is a bleed port or passageway 1405 which prevents pressure build up around the sleeve or connection threads and prevents a possible failure resulting in part ejection. Bleed port or passageway 1405 allows for a visual indication that a connection is leaking. Since the sleeve is not normally a wetted part it may be manufactured from materials other than stainless steel.

Preferred materials of construction include: (1) the tubing is made of cold worked 300 series stainless steel; (2) gland is made of cold worked 316 stainless steel coated with baked on Molykote (molybdenum disulfide); (3) cap is made of alloy steel; (4) the sleeve is made of through hardened Inconel 718 stainless steel with XADC-Armoloy® Coating; (5) the die is made of hardened steel; (6) the housing is made of aluminum; (7) a hydraulic cylinder; and, (8) connection bodies are made of cold worked 316 stainless steel.

Figure 14E:
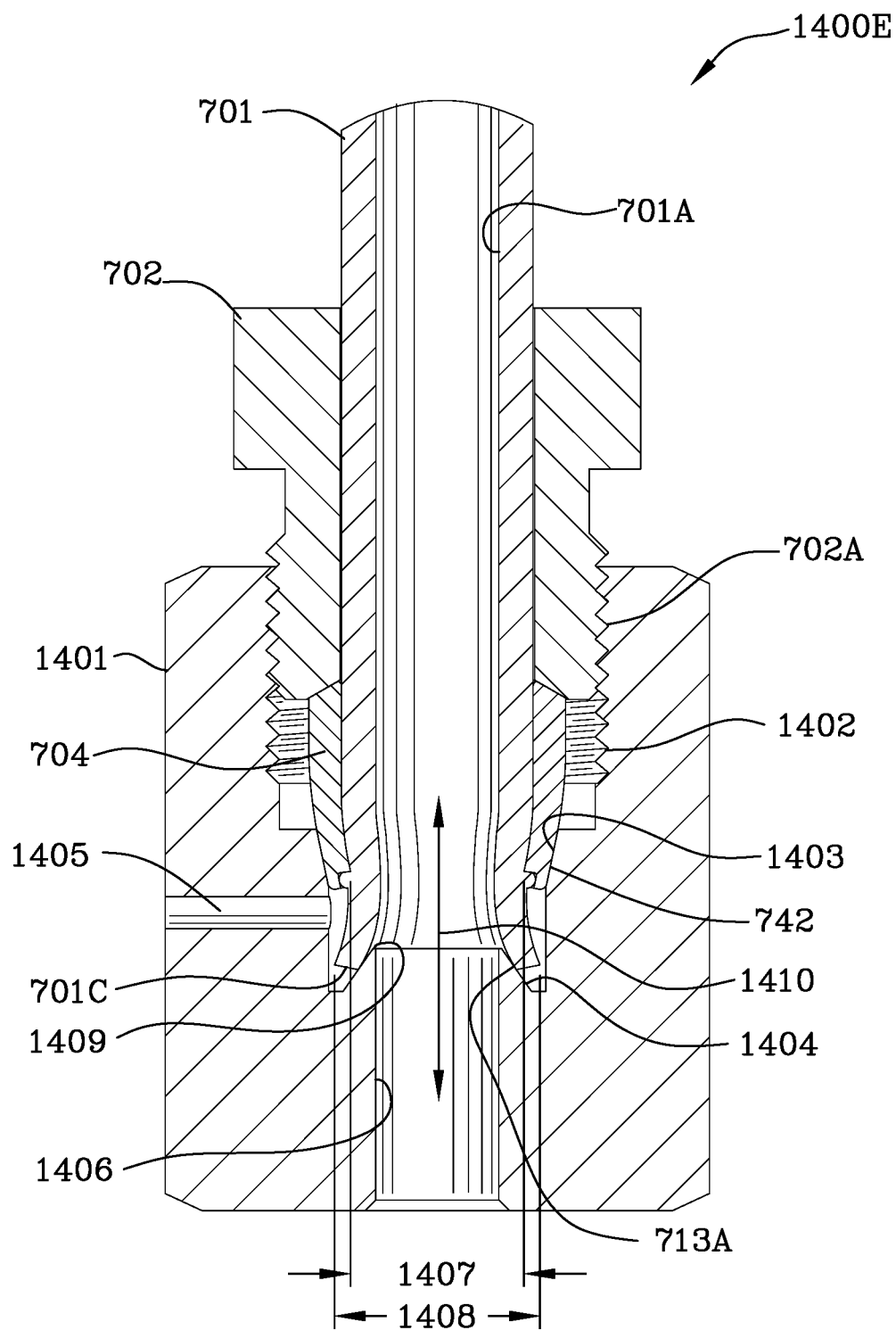
FIG. 14E is an enlarged cross-sectional view of the fitting secured to the connection body wherein the connection body includes a flow path.

FIG. 14E is an enlarged cross-sectional view 1400E of the fitting secured to the connection body wherein the connection body includes a flow path 1406.

The invention as described herein is for use with the cold-worked 15,000 psi tubing. At this time use for 20,000 psi or even higher is envisioned. Tubing rated at 15,000 psi is known as thick-walled tubing and has the following dimensions.

| 15,000 psi tubing (units in inches, nominal) | | |
| --- | --- | --- |
| Outside Diameter | Inside Diameter | Wall thickness |
| ¼" | 0.162" | 0.043" |
| ⅜" | 0.250" | 0.060" |
| 9/16" | 0.359" | 0.099" |
| ¾" | 0.515" | 0.115" |
| 1" | 0.687" | 0.154" |

Cold-worked tubing rated at 20,000 psi is also known as thick-walled tubing and has the following dimensions.

| 20,000 psi tubing (units in inches, nominal) | | |
| --- | --- | --- |
| Outside Diameter | Inside Diameter | Wall thickness |
| ¼" | 0.109" | .070" |
| ⅜" | 0.203" | .084" |
| 9/16" | 0.312" | .122" |

-continued

| 20,000 psi tubing (units in inches, nominal) | | |
|---|---|---|
| Outside Diameter | Inside Diameter | Wall thickness |
| ¾" | 0.437" | .154" |
| 1" | 0.563" | .216" |

For the %6" outside diameter, 15,000 psi rated tubing, approximately 28,000 lbs. of force is applied in deforming the sleeve 704 and flaring the tubing. At this load it has been determined that the sleeve 704 does not buckle under the influence of the hydraulic cylinder raising the die up to and against the cap.

FIGS. 16, 16A, 16B, 16C, 16D, 16E, 17, 18, 18A, 19, 20, 20A and 21 are directed toward a second example of the invention.

Figure 16:
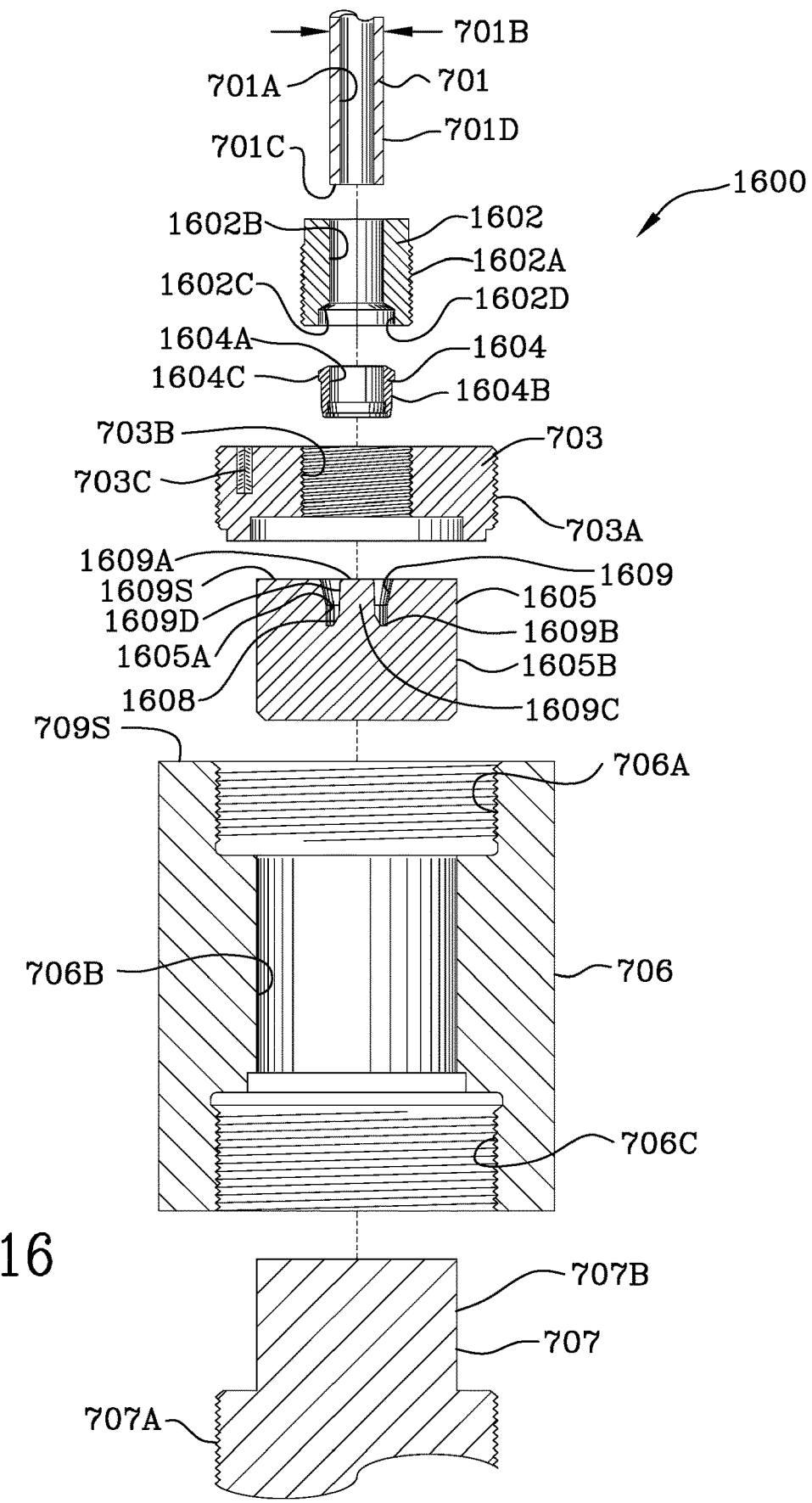
FIG. 16 is an exploded view of an apparatus for making a second example of the fitting.

FIG. 16 is an exploded assembly view 1600 of a driving piston 707, a second die 1605, cap 1603, threaded interconnection 1603A between the cap 1603 and the aluminum housing 706, a second example of a sleeve 1604, a second gland 1602 and tubing 701 of another apparatus for making a second example of the fitting.

Sleeve 1604 includes an inner surface 1604A which is generally cylindrically shaped. Sleeve 1604 includes a first end portion 1690A, an intermediate portion 1643A and a second end portion 1604E. The exterior of the sleeve is preferably coated 1604B with a hardening material such as an XADC-Armoloy® coating 1691 and then it is preferably etched 1696A with an acid to provide an abrasive finish. Second end 1604E of sleeve 1604 includes a reinforcement portion 1604C. The second end portion of the sleeve includes a beveled edge portion 1694 which is coated with a lubricant to facilitate engagement with gland 1602 for making the fitting and with gland 1602 for mating with the connection body 2101. When mating with the connection body the gland/nut 1602 is torqued with a torque wrench to a desired value which applies the proper force to the sleeve 1604 of the fitting.

Figure 16A:
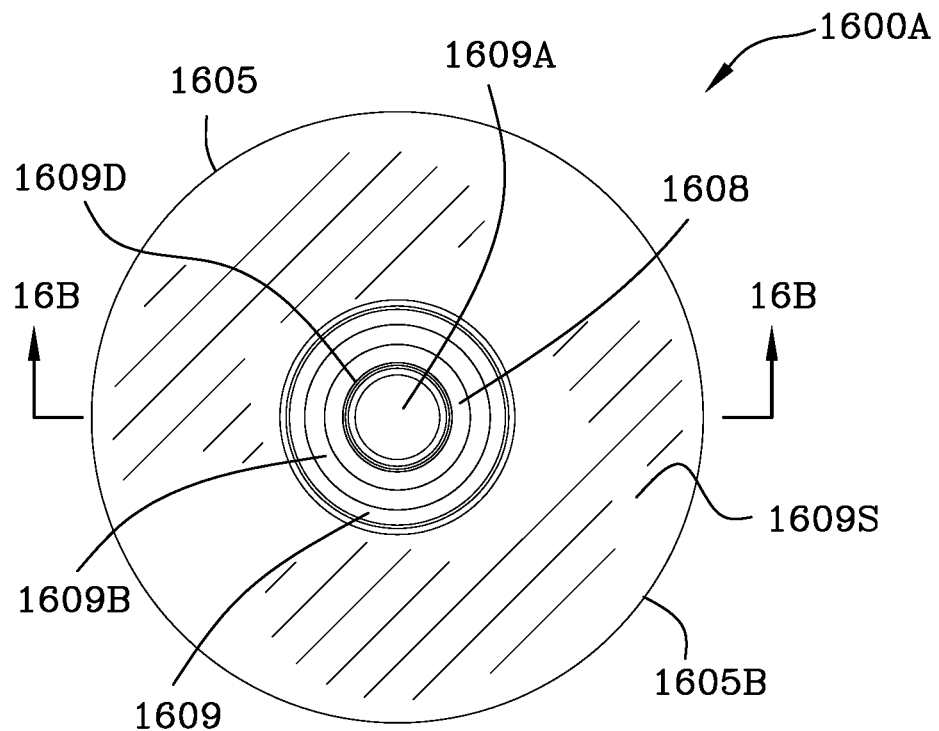
FIG. 16A is a top view of the die used in connection with the apparatus of FIG. 16.
Figure 16B:
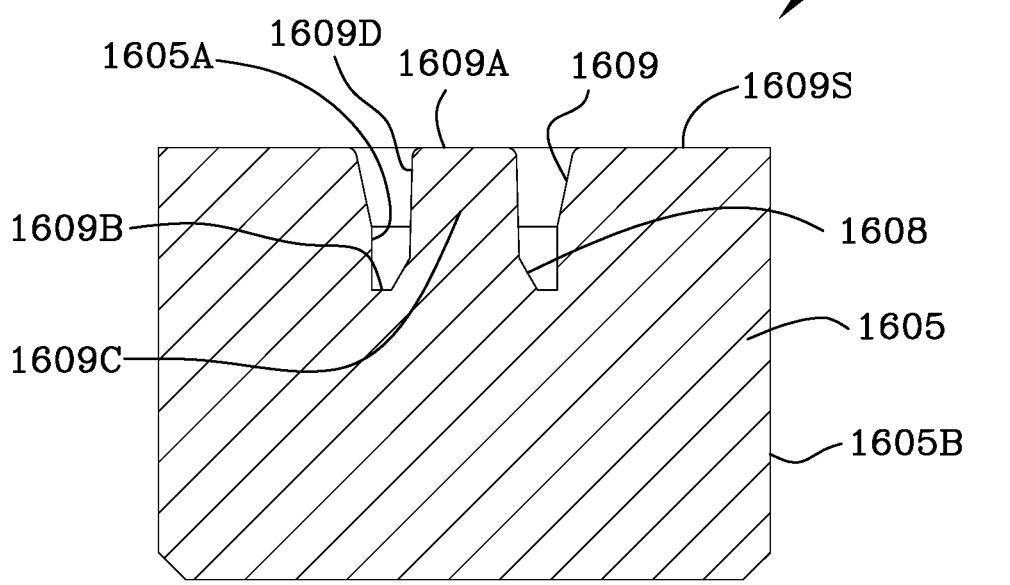
FIG. 16B is a cross-sectional view of the die taken along the lines 16B-16B of FIG. 16A.
Figure 16C:
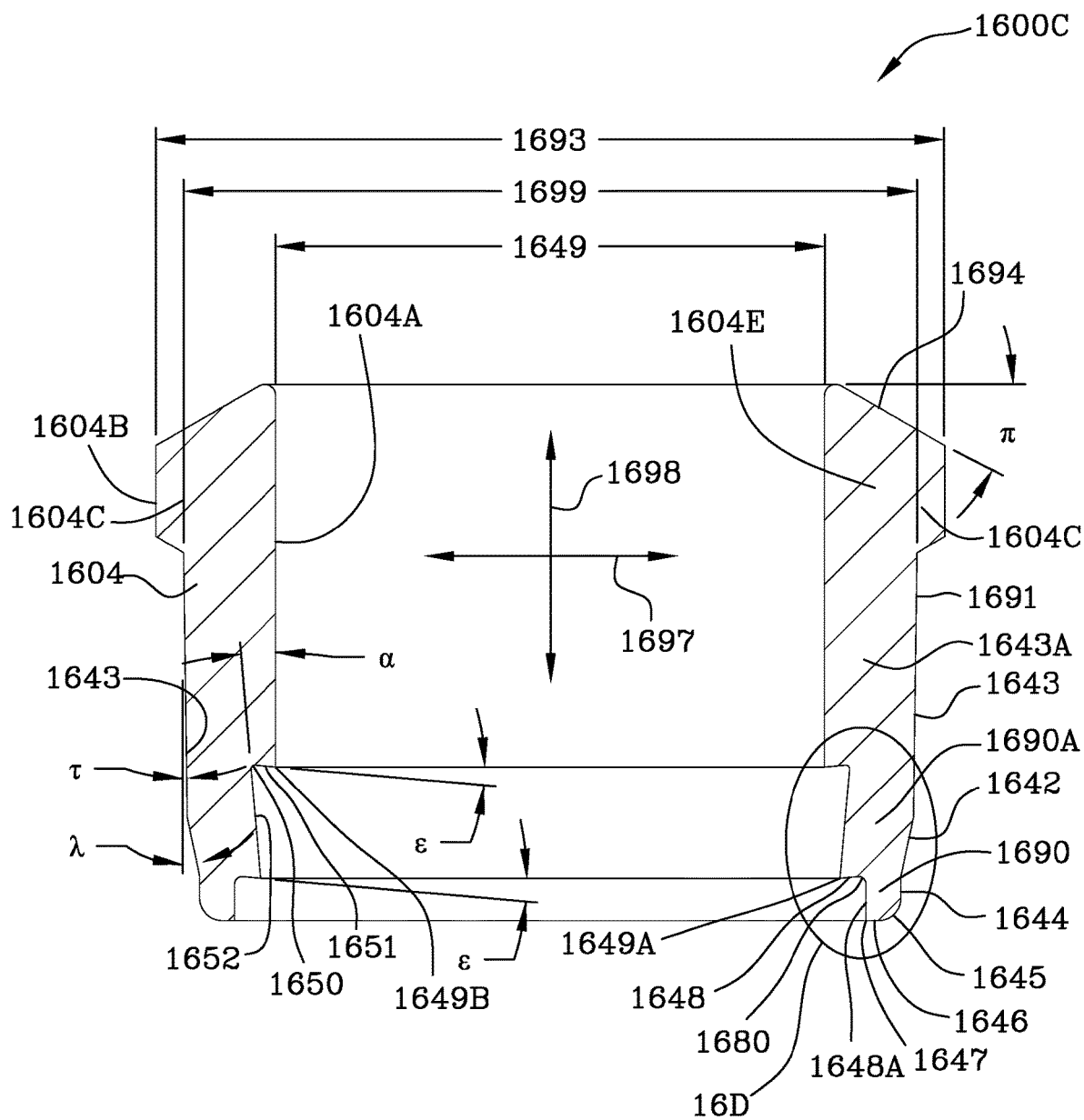
FIG. 16C is an enlarged cross-sectional view of the second example of the sleeve.

Sleeve 1604 includes a tapered exterior portion 1642 at an angle, λ, of approximately 12° as illustrated in FIG. 16C proximate the first end portion 1690A. Sleeve 1604 also includes a tapered exterior portion 1643 at an angle, τ, of approximately 0.776° proximate the intermediate portion 1643A. A cylindrically shaped exterior end portion 1644 of the first end portion 1690A of sleeve 1604 is illustrated in FIG. 16C. Radially curved portion 1645 of the first end portion 1690A of the sleeve 1604 transitions to the generally flat end 1646 of the sleeve which terminates in edge 1647. Edge 1647 of sleeve 1604 is formed by the intersection of second leg 1648A and the generally flat end 1646 of the sleeve.

A first gripping portion includes first leg 1648 of sleeve 1604 and second leg 1648A of sleeve 1604. Reference numeral 1680 refers to an inner concavity of the first gripping portion of sleeve 1604 and reference numeral 1680A represents a space which is occupied by material from the tube during the process of fitting the sleeve to the tube. See FIGS. 16D and 20. A second gripping portion includes fourth leg 1651 and third leg 1652 of sleeve 1604. Reference numeral 1650 represents an inner concavity of second gripping portion of sleeve 1604 and reference numeral 1680B represents a space which is occupied by material from the tube during the process of fitting the sleeve to the tube. See FIGS. 16D and 20. Reference numeral 1649 denotes the inner diameter of sleeve 1604 for the intermediate portion 1643A and for the second end portion 1604E. The inner diameter of sleeve 1604 proximate the first end portion varies as the inner bore is stepped.

Figure 17:
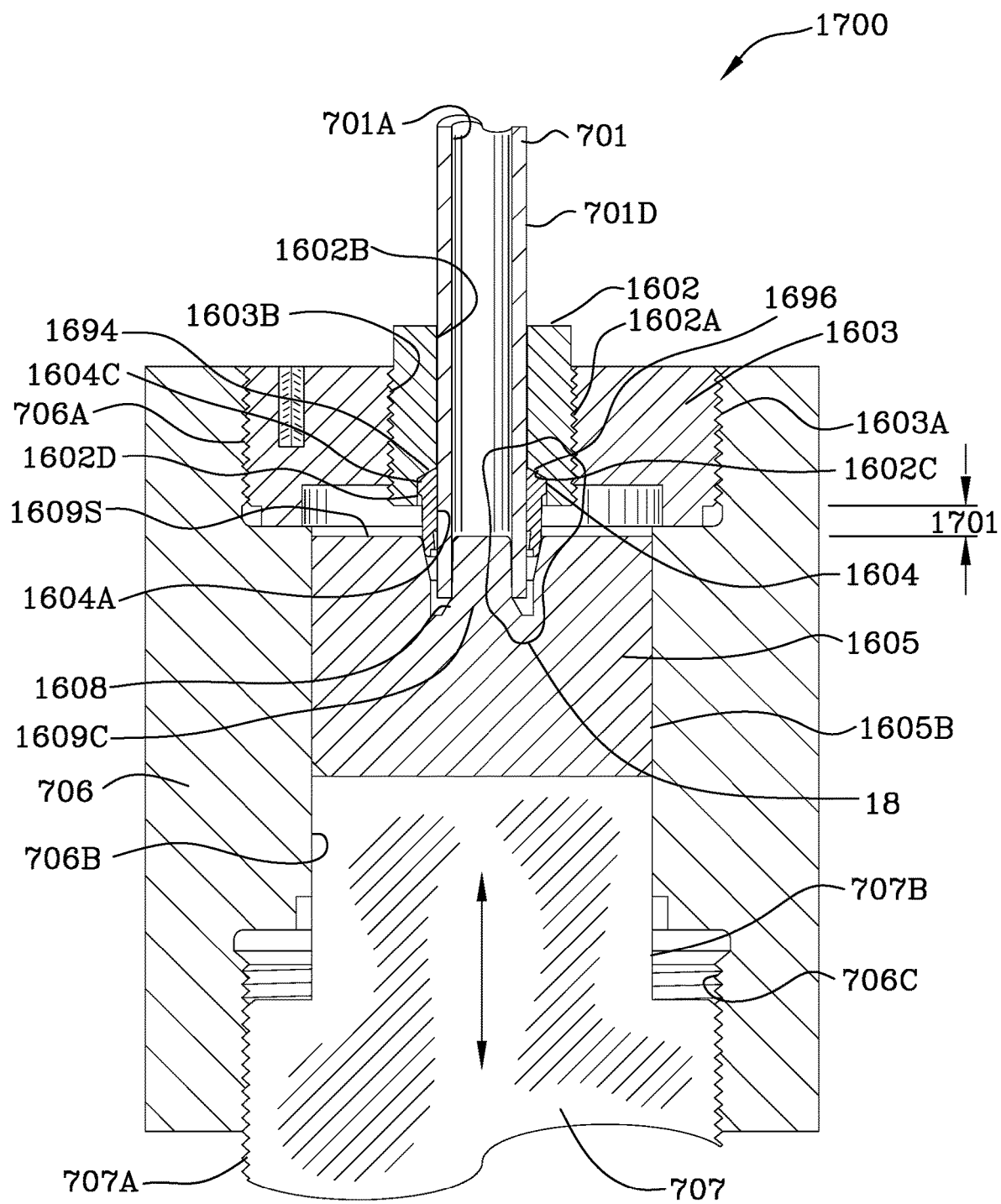
FIG. 17 is a cross-sectional view of the apparatus of FIG. 16 for forming a second example of the fitting assembled illustrating the die in a first position.
Figure 19:
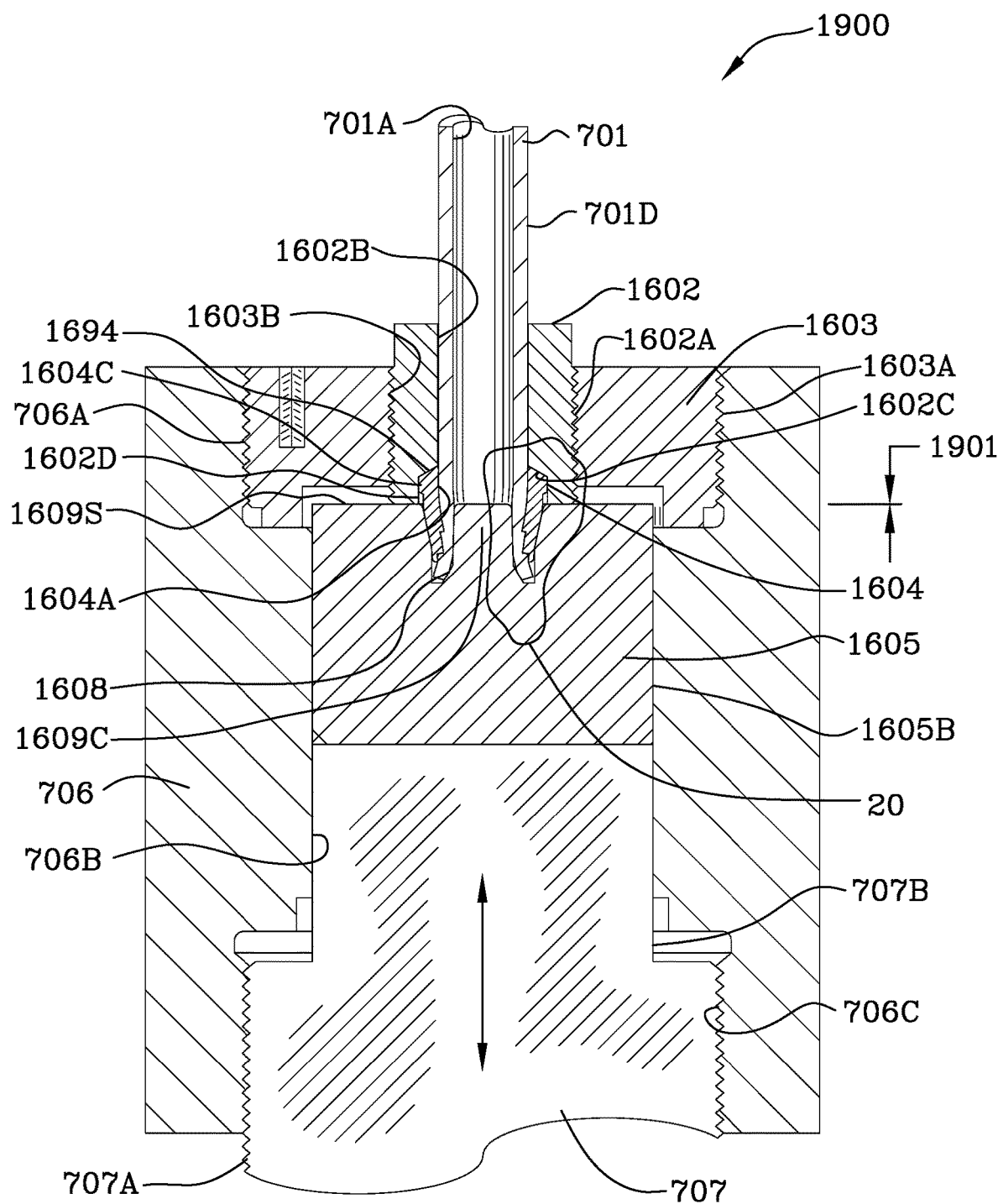
FIG. 19 is a cross-sectional view of the apparatus of FIG. 16 for forming a second example of the fitting assembled illustrating the die in a second, final position.

Gland 1602 includes tapered exterior threads 1602A, an inner diameter 1602B, a sleeve engaging surface 1602C, and a bore 1602D for passing the large shoulder/reinforcement portion 1604C of sleeve 1604. Gland 1602 is threaded into cap 1603 as illustrated in FIGS. 17 and 19.

FIG. 16A is a top view 1600A of the die 1605 used in connection with the apparatus of FIG. 16. FIG. 16B is a cross-sectional view 1600B of the second die 1605 taken along the lines 16B-16B of FIG. 16A. Die 1605 is coated with an XADC Armaloy® coating.

Figure 16D:
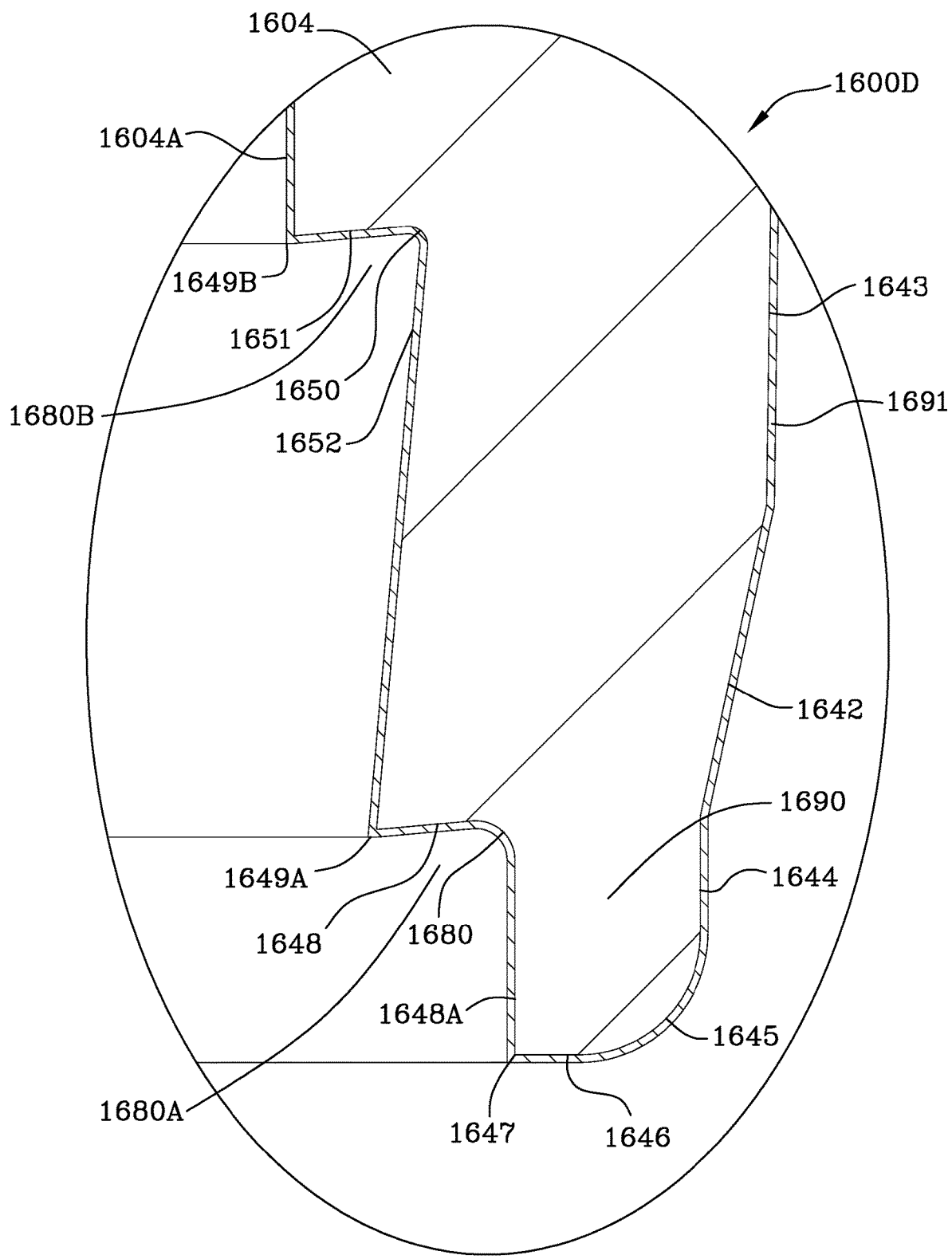
FIG. 16D is an enlarged cross-sectional schematic view of a portion of the second example of the sleeve illustrating details of construction including the coating in an exaggerated depiction.
Figure 16E:
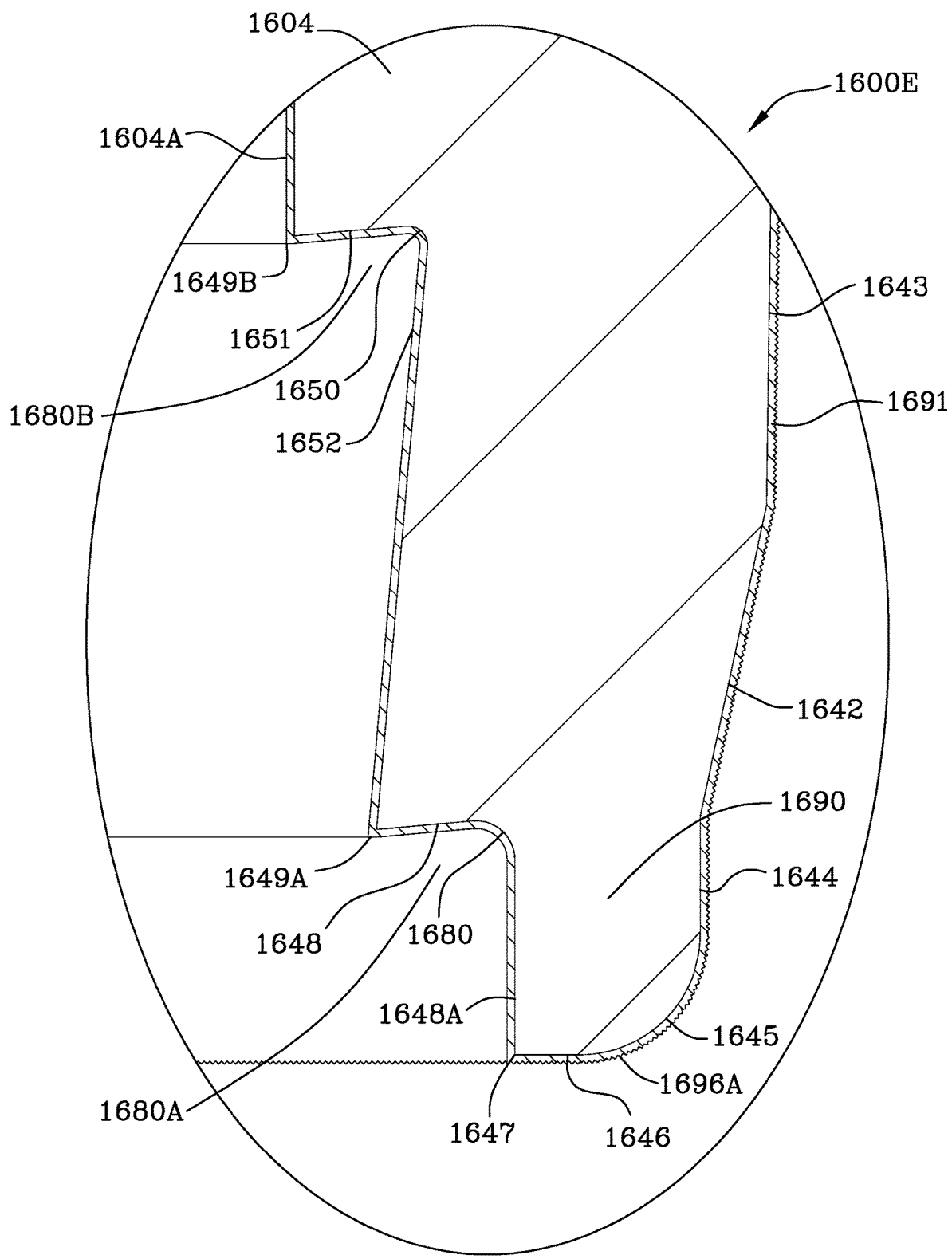
FIG. 16E is an enlargement similar to FIG. 16D illustrating the coating etched.

FIG. 16C is an enlarged cross-sectional view 1600C of the second example of the sleeve 1604. FIG. 16D is an enlarged cross-sectional schematic view 1600D of a portion of the second example 1604 of the sleeve illustrating details of construction including the coating 1691 on the exterior of the sleeve. FIG. 16E is an enlarged view similar to FIG. 16D illustrating the XADC-Armoloy® coating and the acid etching 1696A of the coating.

Referring to FIGS. 16, 16A and 16B, another example of a die 1605 of the invention is illustrated. Reference numeral 1605A represents an interior surface of the die and reference numeral 1605B represents the exterior of die 1605. The sleeve engaging inner wall 1609 is tapered approximately 3.5° and extends to interior surface 1605A of the die 1605.

Tube engaging tapered wall surface 1608 of the guide rod 1609C transitions from the guide rod 1609C to the bottom 1609B of the die 1605 are illustrated in FIG. 16B. Top 1609A of the guide rod 1609C, bottom 1609B of the die 1605, tapered generally cylindrical wall 1609D of the guide rod 1609C, and upper surface 1609S of die 1605 are illustrated in FIG. 16B as well. Guide rod 1609C is slightly tapered at approximately 1.5° and all inner surfaces of die 1605 are lubricated before use.

A tube fitting for use in combination with a thick-walled tube 701 is disclosed. Alternatively, thinner walled tubing may be used. The thick-walled tube includes a passageway therethrough defined by a cylindrically shaped interior surface 701A and is used in combination with a second example of a sleeve 1604. The thick-walled tube includes a cylindrically shaped exterior surface 701D and a wall portion. The thick-walled tube includes an end portion 701C which is flared (see FIG. 21) for connection with a connection body 2101 for communication of fluid through the tube and the connection body.

The second example of a sleeve 1604 includes two inner circumferential biting edges 1649A, 1649B. The second example of the sleeve includes a first end portion 1690A, an intermediate portion 1643A, and a second end portion 1604E. Further, the second example of the sleeve 1604 includes an inner bore 104A through the first end portion 1604E, the intermediate portion 1643A and the second end portion 1604E of the sleeve 1604. The inner bore 1604A of the sleeve includes an interior surface and the sleeve includes an exterior surface. The first end portion 1690A of the sleeve 1604 includes a first varying wall thickness between the interior surface and the exterior surface of the sleeve proximate the first end portion. The second end portion 1604E of the sleeve includes a second varying wall thickness between the interior surface 1604A and the exterior surface 1604B of the sleeve proximate the second end portion 1604E. The intermediate portion 1643A of the sleeve includes a third varying wall thickness between the interior surface and the exterior surface of the sleeve proximate the intermediate portion 1643A. A thin coating 0.0003-0.0006 inches thick of XADC-Armoloy® is applied to the exterior of the sleeve and the coating 1691 may be etched 1696A with an acid or other suitable etchant. See FIG. 16E which illustrates the etching.

Referring to FIG. 16C, the inner bore 1604A of the second example of the sleeve 1604 through the first end portion 1690A includes a first shoulder/first leg 1648 terminating in a first sharp inner circumferential biting edge 1649A. The inner bore 1604A of the second example of the sleeve through the first end portion 1690A includes a second shoulder/fourth leg 1651 terminating in a second sharp inner circumferential biting edge 1649B. The first sharp inner circumferential biting edge 1649A has a first diameter and the second sharp inner circumferential biting edge 1649 has a second diameter. The sleeve 1604 engages the thick-walled tube when die 1605 is forced upwardly by piston 707 as illustrated in FIGS. 17 and 19. As the piston is raised upwardly, gap 1701 (FIG. 17) decreases until it no longer exists as represented by reference numeral 1901.

Figures 20, 20A:
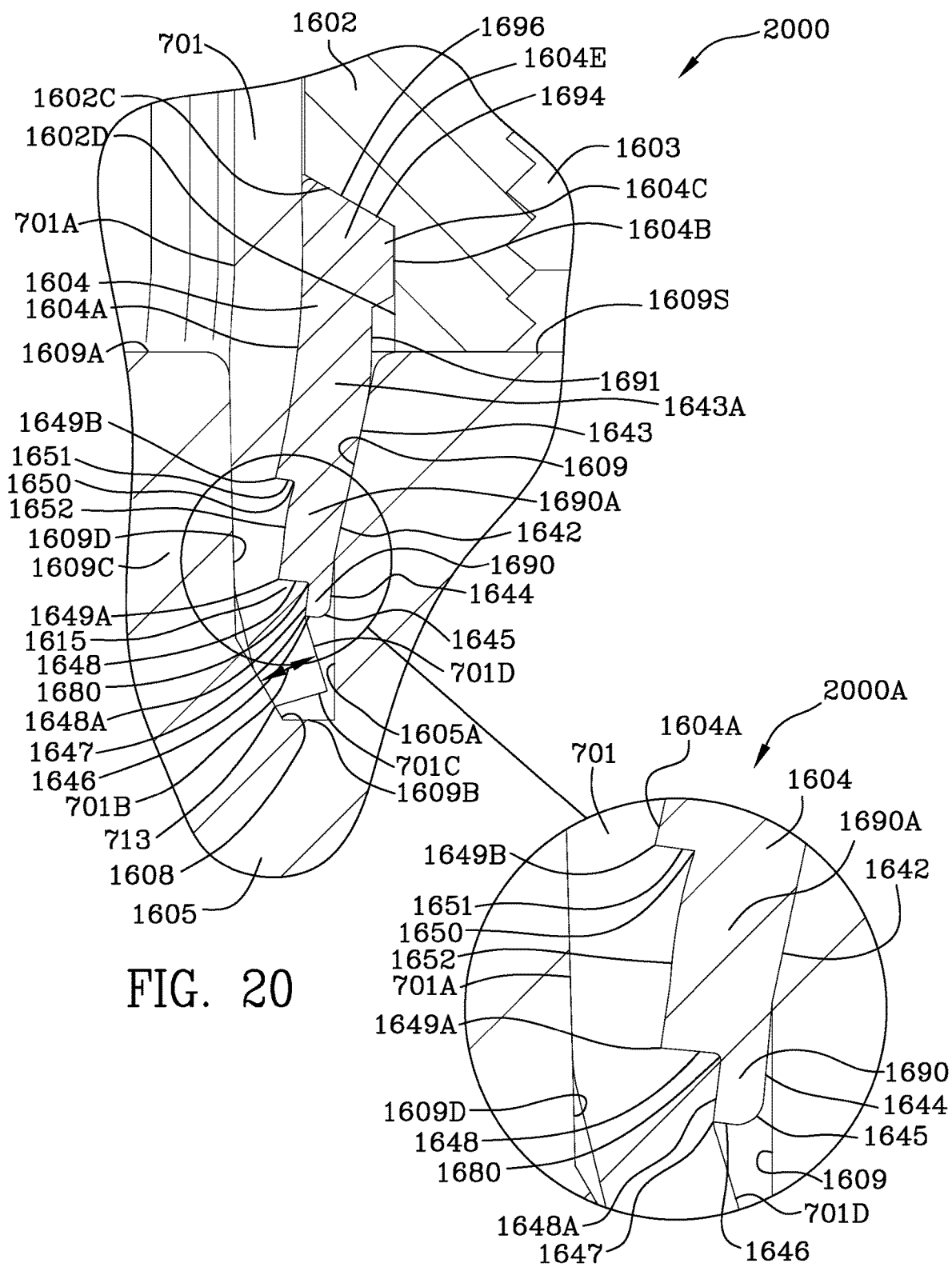
FIG. 20 is an enlarged portion of FIG. 19 illustrating the die in a second, final position.
FIG. 20A is an enlarged portion of FIG. 20.

Referring to FIGS. 19, 20 and 20A, the first sharp inner circumferential biting edge 1649A has a first diameter which interengages and bites into and through the exterior of the end portion 701C of the thick-walled tube and into the wall portion of the end portion of the thick-walled tube 701 without narrowing the passageway of the thick-walled tube. FIG. 19 is a cross-sectional view 1900 of the apparatus of FIG. 16 for forming a second example of the fitting assembled illustrating the die 1605 in a second, final position. In the final position, gland 1602 has been torqued to a preset value (or tapered threads have been used) and the top of the die 1609S has been brought into engagement with the bottom of gland 1602 deforming the sleeve. First and second sharp inner circumferential biting edges extend approximately equidistantly into tube 701 as viewed in FIGS. 20 and 20A.

Figure 21:
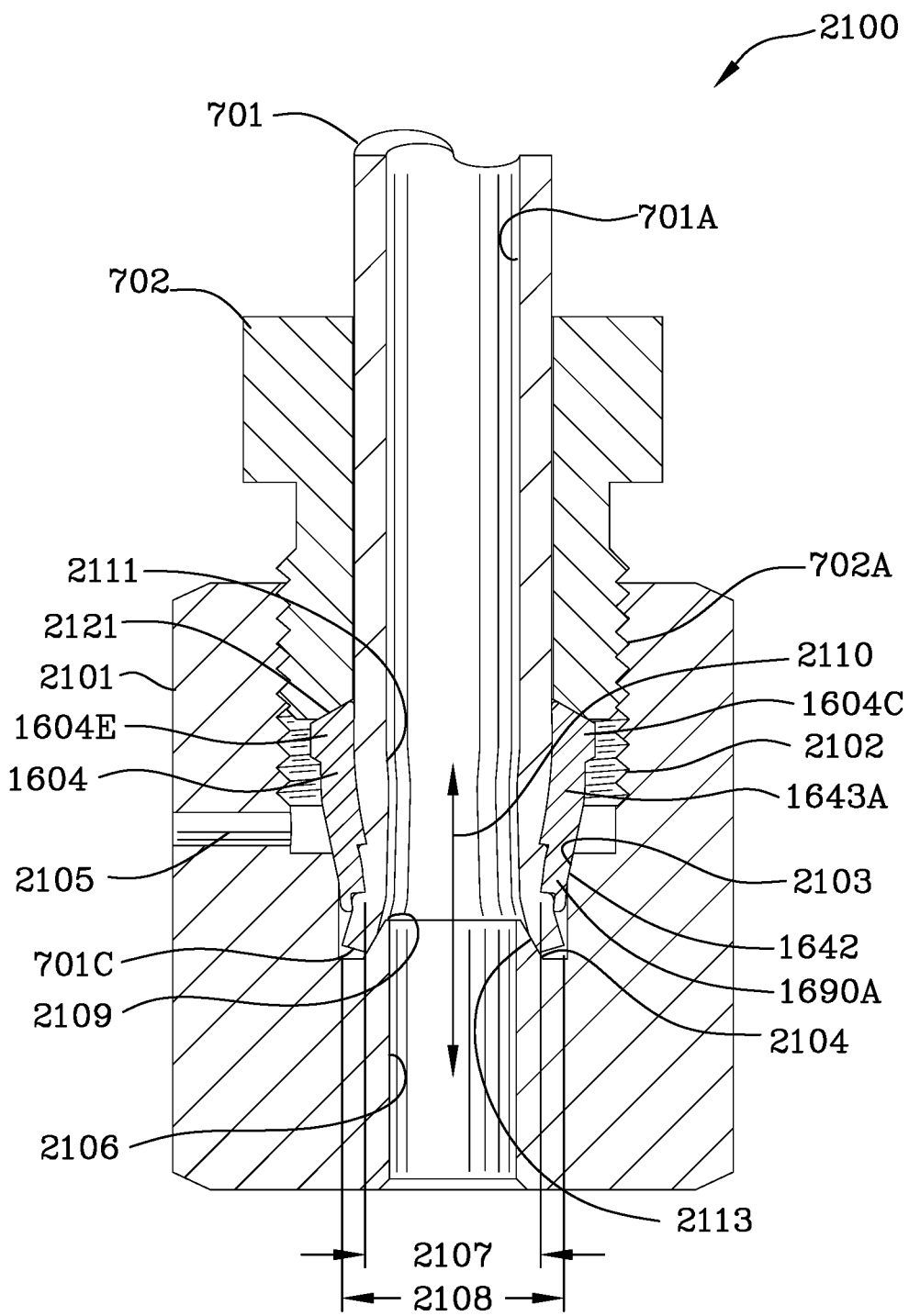
FIG. 21 is an enlarged cross-sectional view of the second example of the fitting secured to the connection body wherein the connection body includes a flow path.

FIG. 20 is an enlarged view 2000 of a portion of FIG. 19 illustrating the die 1605 in a second, final position. FIG. 20A is an enlarged view 2000A of a portion of FIG. 20. See FIG. 21, an enlarged cross-sectional view of the second example of the fitting secured to the connection body wherein the connection body 2101 includes a flow path 2110 which is substantially completely unobstructed 2111 by the fitting, to wit, by the compression of the sleeve 1604, against and into the thick-walled tube 701. Reference is made to FIG. 14E wherein a first example of the sleeve is used and reference numeral 1410 denotes a flow arrow and reference numeral 1411 denotes a slight deformation of the wall of the tube into the flow path. FIG. 14E has been tested with very favorable flow characteristics. FIG. 21 virtually represents an unobstructed flow path through the thick-walled tube and the connection body 1401.

Still referring to FIGS. 19, 20, 20A and 21, the second sharp inner circumferential biting edge 16496 has a second diameter which interengages and bites into and through the exterior of the end portion 701C of the thick-walled tube 701 and into the wall portion of the end portion 701C of the thick-walled tube without substantially narrowing the passageway of the thick-walled tube. Die 1605 employs a guide rod which has a tapered surface at an angle of 1.5° which limits any bending of tube 701 inwardly. See FIGS. 19, 20 and 21.

The second varying wall thickness of the reinforcement portion 1604C of the second end portion 1604E of the sleeve 1604 is greater than the third varying wall thickness of the intermediate portion 1643A of the sleeve and the first varying wall thickness of the first end portion 1690A of the sleeve. The reinforcement portion 1604C of the second end portion prevents buckling of the sleeve when it is forced into the die as illustrated in FIGS. 19, 20 and 20A.

The first end portion 1690A of the sleeve 1604 includes a generally z-shaped in cross-section stepped inner bore 1604A, 1651, 1652, 1648, 1648A comprising first and second gripping portions which include the first and second inner circumferential biting edges 1649A, 1649B. The first gripping portion includes first 1648 and second 1648A legs and the second gripping portion includes third 1652 and fourth 1651 legs. The first leg 1648 of the first gripping portion and the third leg 1652 of the second gripping portion terminate in the first sharp inner circumferential biting edge 1649A of the sleeve 1604. The fourth leg 1651 of the second gripping portion and the inner bore 1604A of the intermediate portion of the sleeve terminate in the second sharp inner circumferential biting edge 16496 of the sleeve 1604. The first and second sharp inner circumferential biting edges 1649A, 16496 extend approximately radially equidistantly into the sleeve 1604 as shown in FIGS. 20, 20A and 21.

Referring to FIG. 16C, the first leg 1648 and the second leg 1648A form an angle less than 90°. Similarly, the third leg 1652 and the fourth leg 1651 form an angle less than 90°. The first and fourth legs 1648, 1651 are oriented an angle, $\epsilon$, of approximately 5° with respect to the transverse axis 1697 of the sleeve 1604. Third leg 1652 forms an angle, $\alpha$, of approximately 5° with respect to the longitudinal axis 1698 of the sleeve 1604. The transverse axis 1697 is orthogonal to the longitudinal axis 1698 as illustrated in FIG. 16C. The longitudinal axis is parallel to the inner surface as represented by the reference numeral 1604A.

Reinforcement portion 1604C includes an upper beveled edge portion 1694 which interengages 1696 surface 1602C of gland 1602 during formation of the compression fitting as illustrated. See FIG. 17 which shows the interengagement 1696 of the beveled edge 1694 with the gland 1602. Upper beveled edge 1696 is formed at an angle, $\pi$, of approximately 30° with respect to the transverse axis 1697. The exterior surface 1643 of the sleeve 1604 proximate the intermediate portion 1643A is slightly tapered, for example, at an angle, $\tau$, of approximately 0.776°. Similarly, the exterior surface 1642 of the sleeve 1604 proximate the first end portion 1690A is tapered, at an angle, $\lambda$, approximately 12° with respect to the longitudinal axis 1698 of the sleeve 1604. See FIG. 16C.

Still referring to FIG. 16C, the nominal outer diameter 1699 of sleeve 1604 is 1.000 inches, the nominal diameter 1693 of the reinforcement portion 1604C portion is 1.075 inches and the diameter of the lip portion 1690 of the first end portion 1690A (as measured from the surface 1644 of the lip portion 1690) is 0.956 inches. The inner diameter of the sleeve is 0.748 inches. These indicated dimensions are by way of example only and those skilled in the art will recognize that changes may be made to these dimensions without departing from the spirit and scope of the invention as claimed below. Different sized tubing, different sized sleeves, different sized dies and glands may be used without departing from the spirit and the scope of the appended claims.

The tube fitting is used in combination with a connection body 2101 as illustrated in FIG. 21. The first sharp inner circumferential biting edge 1649A of the first end portion of the sleeve 1604 includes a first diameter which interengages and bites into and through the exterior of the end portion of the thick-walled tube and into the wall portion of the end portion 701C of the thick-walled tube without narrowing the passageway of the thick-walled tube. The second sharp inner circumferential biting edge 16496 of the first end portion 1690A of the sleeve includes a second diameter which interengages and bites into and through the exterior of the end portion of the thick-walled tube and into the wall portion of the end portion 701C of the thick-walled tube without narrowing the passageway of the thick-walled tube.

The second varying wall thickness of the reinforcement portion 1604C of the second end portion 1604E of the sleeve is greater than the third varying wall thickness of the intermediate portion 1643A of the sleeve and the first varying wall thickness of the first end portion 1690A of the sleeve. A gland 702 about the thick-walled tube is engageable 2121 with the beveled edge 1694 of the sleeve and the gland includes exterior threads 702A engageable with interior threads of the connection body 2101. The exterior threads of the gland interengage the interior threads of the connection body 2101, coupling/joining the tube 701, the tube fitting 701 and the connection body 2101 together. The flared end of the thick-walled tube 701C interengages and seals against the frusto-conical portion of the connection body 2101.

A process for making a tube fitting using the second example of the sleeve in combination with a thick-walled tube 701 (or thinner walled tube) is disclosed. The thick-walled tube includes a passageway therethrough defined by a cylindrically shaped interior surface 701A and the second example of the sleeve 1604 includes two sharp inner circumferential biting edges 1649A, 1649B. The thick-walled tube includes a cylindrically shaped exterior surface 701D, the thick-walled tube includes a wall portion, and, the thick-walled tube includes an end portion 701C. The steps of the process include placing an end portion 701C of a thick-walled tube into engagement with a die 1605, the end portion of the thick-walled tube engages a surface 1609D of a tapered, generally cylindrical, wall of a guide rod 1609C of the die 1605 such that the interior surface 701A of the tube interengages the tube engaging surface of the tapered, generally cylindrical wall of the guide rod 1609C of the die 1605, and, the thick-walled tube further engages a transitioning surface 1608 from the guide rod 1609C to the bottom 1609B of the die 1605. See, FIGS. 17, 18 and 18A. The die is supported by a driving piston 707.

The process also includes sliding a sleeve 1604 over the tube 701 positioning the sleeve for compression into engagement with the thick-walled tube. The sleeve includes: a first end portion 1690A, an intermediate portion 1643 and a second end portion 1604E; an inner bore 1604A through the first end portion 1609A, the intermediate portion 1643A and the second end portion of the sleeve 1604E; the inner bore 1604A of the sleeve includes an interior surface; the sleeve includes an exterior surface; the first end portion 1690A of the sleeve includes a first varying wall thickness between the interior surface and the exterior surface of the sleeve proximate the first end portion; the second end portion 1604E of the sleeve includes a second varying wall thickness between the interior surface and the exterior surface of the sleeve proximate the second end portion; the intermediate portion 1643A of the sleeve includes a varying wall thickness between the interior surface and the exterior surface of the sleeve proximate the intermediate portion; the inner bore of the sleeve through the first end portion includes a first shoulder/first leg 1648 terminating in a first sharp inner circumferential biting edge 1649A; the inner bore of the sleeve through the first end portion includes a second shoulder/fourth leg 1651 terminating in a second sharp inner circumferential biting edge; and, the first sharp inner circumferential biting edge 1649A has a first diameter and the second sharp inner circumferential biting edge 16496 has a second diameter.

The process further includes the step of restraining, using a gland 1602, the sleeve in position with respect to the thick-walled tube 701 and the die 1605. Further, the process includes driving the die 1605 into the thick-walled tube 701 and the sleeve 1604 with the driving piston 707 flaring the end of the thick-walled tube 701C and securing the sleeve into forceful engagement with the thick-walled tube. The die 1605 forces the first sharp inner circumferential biting edge 1649A into and through the exterior of the end portion of the thick-walled tube and into the wall portion of the end portion of the thick-walled tube without narrowing the passageway of the thick-walled tube. The die 1605 forces the second sharp inner circumferential biting edge 16496 into and through the exterior of the end portion of the thick-walled tube and into the wall portion of the end portion of the thick-walled tube without narrowing the passageway of the thick-walled tube. The exterior of the sleeve may be coated with an XADC-Armoloy® coating 1691 and etched 1696A before it is slid over the thick-walled tube 701. Actually, the interior and exterior of the sleeve are covered with the coating as it is dipped in the coating material. Coatings other than XADC-Armoloy® may be used. The inner diameter 1649 of the sleeve 1604 is slightly larger than the outer diameter of the thick-walled tube. The process may include applying a lubricant to the die 1605 prior to placing an end portion of a thick-walled tube into engagement with the die. The step of driving the die into the thick-walled tube continues until the die 1605 abuts the gland 1602. See FIG. 19.

The step of driving the die into the thick-walled tube and the sleeve with the driving piston, flaring the end of the thick-walled tube, and securing the sleeve into forceful engagement with the thick-walled tube, includes forcing the first and second sharp inner circumferential biting edges 1649A, 16496 into and through the exterior of the end portion of the thick-walled tube and into the wall portion of the end portion of the thick-walled tube approximately equidistantly without narrowing the passageway of the thick-walled tube.

Figures 18, 18A:
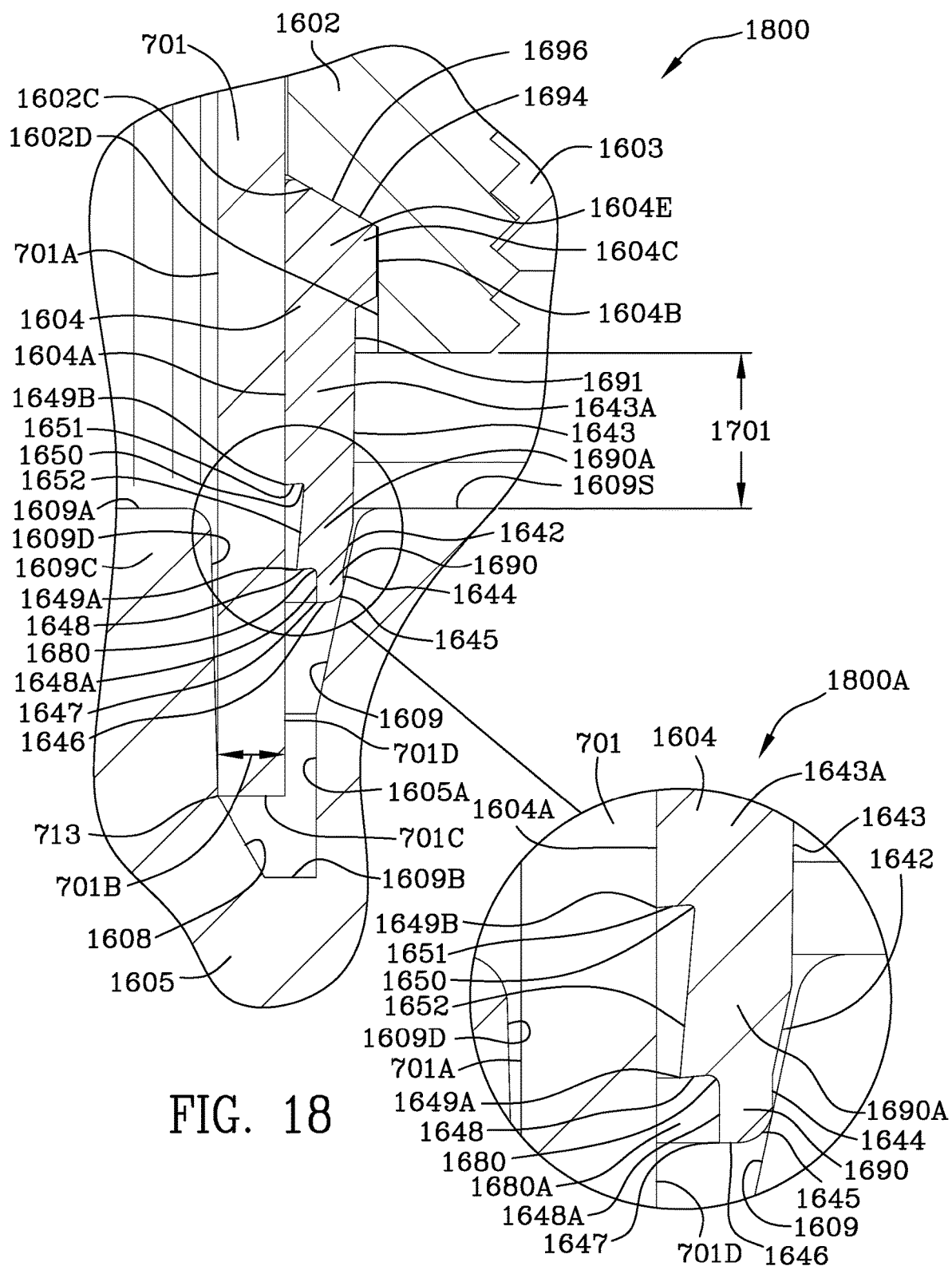
FIG. 18 is an enlarged portion of FIG. 17 illustrating the die in a first position.
FIG. 18A is an enlarged portion of FIG. 18.

FIG. 17 is a cross-sectional view 1700 of the apparatus of FIG. 16 for forming a second example of the fitting. FIG. 17 illustrates the die 1605 in the first position. In the first position the driving piston 707 has not been actuated. FIG. 18 is an enlarged view 1800 of a portion of FIG. 17 illustrating the die 1605 in the first position. Reference numeral 1701 signifies the gap between the gland 1602 and the upper surface 1609S of the die 1605. FIG. 18A is an enlarged view 1800A of a portion of FIG. 18.

FIG. 19 is a cross-sectional view 1900 of the apparatus of FIG. 16 for forming a second example of the fitting. FIG. 19 illustrates the die 1605 in the second, final position with no gap between the gland 1602 and the upper surface 1609S of the die 1605. In FIG. 19, the piston 707 has been rotated and the threads 706C have driven the piston upwardly pushing the die 1605 into engagement with the gland. FIG. 20 is an enlarged view 2000 of a portion of FIG. 19 illustrating the die 1605 in the second, final position. FIG. 20A is a view 2000A of an enlarged portion of FIG. 20 illustrating the die 1605 engaging the gland 1602. FIG. 20A illustrates that the metal from the sleeve 701 has been deformed into the cavities 1650 and 1680.

FIG. 21 is an enlarged cross-sectional view of the second example of the fitting secured to the connection body 2101 wherein the connection body 2101 includes a flow path as indicated by flow arrow 2110. Reference numeral 2111 indicates a very slight deformation of the tube 701 and very little impedance to the flow of fluid through tube 701. Connection body 2101 includes threads 2102 which mate with threads 702A of gland 702. Sleeve engaging surface 2103 of the connection body interengages sleeve 1604. A frusto-conical shaped structure 2109 of the connection body 2101 includes a mating portion 2104 which interengages 2113 the inner portion of the end of tube 701C. Connection body 2101 includes a bleed port 2105 to determine leaks. Counterbore 2106 in frusto-conically shaped mating portion provides a flow pathway therethrough. Reference numeral 2107 represents the approximate inner depth of engagement of the first and second sharp inner circumferential biting edges 1649A, 16496 of the sleeve after compression. Reference numeral 2108 represents, approximately, the outside diameter of the tube after flaring.

Preferred materials of construction of the second example of the invention described in connection with FIGS. 16-21 include: (1) the tubing 701 is made of cold worked 300 series stainless steel; (2) gland 1602 is made of cold worked 316 stainless steel coated with baked on Molykote® (molybdenum disulfide), a registered trademark of Dow Corning Corporation; (3) cap 703 is made of alloy steel; (4) the sleeve 1604 is made of through hardened Inconel 718 stainless steel (Rockwell hardness 36) (other steel alloys may be used) with XADC-Armoloy® Coating (Rockwell hardness 93) or TDC-Armoloy® Coating (78 Rockwell hardness); (5) the die 1605 is made of hardened steel; (6) the housing 706 is made of aluminum; and, (7) a hydraulic cylinder. When the flared tubing 701C engages the frusto-conical portion of the connection body 2101 a seal is formed and the sleeve remains dry (not in contact with the process fluid).

Reference Numerals 100 cross-sectional view of prior art patent U.S. Pat. No. 2,850,303
10 tube
11 connection body
12 coupling nut
13 contractible sleeve
14 male threads
15 female threads
16 cam surface
17 annular cam surface
18 socket
19 terminating end surface
20 wedge insert
21 abutting end surface
22 annular wedge wall
23 knurled portion
24 rounded nose
25 continuous annular body
26 segmental fingers
27 slots
28 forward contractible end portion
29 end portion
30 cam surface
31 bore
32 rib
33 triangular apex meeting at a point
34 recess wall
35 laterally extending circumferential wall
37 shell
38 cam shoulder
39 cam shoulder
40 forward biting edge or shoulder
41 shell
42 bore
45 conical opening
46 first end portion
47 region
48 triangular space
49 first end region
50 second end region
51 intermediate portion of the annular cam surface
200 enlarged and fragmentary cross-sectional view of prior art U.S. Pat. No. 2,850,303
300 modified form of prior art U.S. Pat. No. 2,850,303
400 fragmentary side view of the wedge insert
500 fragmentary cross-sectional view along the line 2-2 of 200
600 cross-sectional view of prior art U.S. Pat. No. 3,970,336
600A cross-sectional view of prior art device
600B enlargement of a portion of the cross-sectional view of prior art device
610 body
611 bore
612 bore
613 transverse shoulder
615 body cam surface
617 tube
618 outer portion
620 transverse shoulder
622 sleeve
624 radially contractible portion
625 enlarged portion
638 coupling nut
639 threaded interconnection between body 610 and nut 638
642 tapered shoulder
650 square die
651 housing
652 gland
653 threads between housing and gland
654 sleeve
655 tubing
656 annular hook-shaped peel
657 annular tip of hook-shaped peel
658 annular biting edge of sleeve
659 interengagement of sleeve 654 and tubing 655
660 sleeve extension
661 gap between the sleeve extension 660, tube 655 and annular hook-shaped peel
700 exploded assembly view of piston, die, cap, sleeve, gland and tubing
700A open, upper end view of the die
700B cross-sectional view of the die taken along the lines 7B-7B
700C cross-sectional view of an enlarged sleeve
700D exaggerated cross-sectional view illustrating the coating
700E enlargement of a portion of FIG. 7D
701 thick walled tubing
701A inner tubing
701B width of the tubing
701C end of tubing
701D outer surface of the tubing
702 gland
702A exteriors threads on gland
702B inner diameter
702C sleeve engaging surface
703 cap 703A exterior threads
703B threads in the cap
703C aperture enabling cap to be threaded into housing 706
704 sleeve
704A inner contoured surface of the sleeve
704B coated exterior of sleeve
705 die
705A interior of die
705B exterior of die
706 aluminum housing
706A interior threads in the housing
706B internal inner diameter of aluminum housing
706C second set of internal threads in housing
707 screwed hydraulic cylinder
707A exterior threads on the screwed hydraulic cylinder
707B driving portion of cylinder slidingly guided by inner surface 706B of aluminum housing
708 tube engaging tapered wall surface of frusto-conically portion of flaring cone 709C
709 sleeve engaging tapered inner wall of die 705
709A plateau of the cone 709C
709B flat bottom inner portion of die
709C frusto-conically shaped flaring cone
709S upper surface of die 705
710 interengagement between gland and sleeve
712 annular cut in the thick-walled tubing
712A annular cut in the thick-walled tubing
713 inside of the end portion of the tube
713A interengagement of the inner portion of the tube and the frusto-conical portion of the flaring cone
715 deformation the annular lip of the tube
715A increased deformation of the annular lip of the tube
715b maximum deformation of the annular lip of the tube
716 flared portion of the tube
740 interengagement of the sleeve and the thick-walled tube
741 inner concavity in sleeve 704
741A gap between the sleeve and the tube
742 tapered outer surface of sleeve 704
743 tapered exterior surface
744 exterior end portion of the sleeve
745 radially curved portion of the sleeve
746 end portion of the sleeve
747 edge
748 first leg
748A second leg
749 inner diameter of the sleeve
749A annular sharp biting edge
780 inner concavity of gripping portion
780A space
790 extended lip portion
791 coated outer surface of sleeve
793 outer diameter of the sleeve
794 upper beveled edge portion of sleeve
795 inward bulge of inner surface 701A
796A etched outer surface of coating 791
800 cross-sectional view of the piston, die, cap, sleeve, gland and tubing assembled together
900 cross-sectional view of the piston, die, cap, sleeve, gland and tubing assembled together
900A enlarged cross-sectional view of a portion of FIG. 9
901 gap between cap and piston
1000 cross-sectional view of the piston, die, cap, sleeve, gland and tubing assembled together
1000A enlarged portion of FIG. 10
1001 reduced gap between cap and piston
1100 cross-sectional view of the piston, die, cap, sleeve, gland and tubing assembled together
1100A enlarged portion of FIG. 11
1101A gap during flaring and fitting process
1200 cross-sectional view of the piston, die, cap, sleeve, gland and tubing assembled together
1200A enlarged portion of FIG. 12
1201 zero gap
1300 cross-sectional view of the piston, die, cap, sleeve, gland and tubing assembled together
1301 gap as the hydraulic cylinder is being withdrawn
1400 front view of the fitting
1400A cross-sectional view of the fitting
1400B front view of the housing
1400C cross-sectional view of the fitting taken along the lines 14C-14C
1400D cross-sectional view of the fitting engaged with the housing
1400E an enlarged cross-sectional view of the fitting secured to the connection body wherein the connection body includes a flow path 1406.
1401 mating body
1402 threaded interconnection with the fitting
1403 sleeve engaging surface
1404 frusto-conical surface of the mating body
1405 bleed port to determine leaks
1406 counterbore in frusto-conically shaped structure
1407 inner diameter of the sleeve after compression
1408 outside diameter of the tube after flaring
1409 frusto-conically shaped structure 1409 of the connection body
1410 flow path/passageway in the connection body
1411 slight protrusion of tubing in flow path/passageway in the connection body
1500 schematic of the process for making the tube fitting in combination with a thick-walled tube
1501 placing a thick-walled tube into engagement with the frusto-conical portion of a die such that the inner diameter of the tube interengages the conical portion of the frusto-conical portion of the die, the die supported by a driving piston
1502 sliding a sleeve over the tube, the sleeve includes an interior and an exterior, the exterior of the sleeve being etched and having a coating thereover, the sleeve includes a sharp annular biting portion engaging the thick-walled tube, the sleeve includes an interior annular symmetric concavity, the concavity of the sleeve interengaging the thick-walled tube
1503 securing the sleeve into forceful engagement with the die
1504 driving the die into the thick-walled tube and the sleeve with the driving piston; flaring the end portion of the thick-walled tube
1505 deforming the sleeve into engagement with the thick-walled tube
1506 the step of driving the die into the thick-walled tube includes forcing and engaging the sharp annular biting portion with the thick-walled tube deforming the tube into engagement with the recess in the extended lip
1600 exploded assembly view of piston, die, cap, sleeve, gland and tubing of another example of the invention
1600A top view of die 1605
1600B cross-sectional view of die 1605 taken along the lines 16B-16B of FIG. 16A
1600C cross-sectional view of sleeve 1604
1600D enlarged cross-sectional view of sleeve 1604
1600E enlarged cross-sectional view of sleeve illustrating etched outer surface
1602 gland 1602A exterior threads on gland
1602B inner diameter
1602C sleeve engaging surface
1602D bore for passing large shoulder of sleeve
1603 cap
1603A threaded interconnection between cap 1603 and aluminum housing 706
1604 another example of a sleeve
1604A inner surface of the sleeve 1604
1604B coated exterior of sleeve 1604
1604C rib reinforcement on outer portion of sleeve 1604
1604E second end portion of sleeve 1604
1605 another example of a die of the invention
1605A interior of die
1605B exterior of die
1608 tube engaging tapered wall surface of the guide rod 1609C, transitioning from the rod to the bottom 1609B of the die
1609 sleeve engaging inner wall of die 1605
1609A top of the guide rod 1609C
16096 bottom of the die
1609C guide rod in the die
1609D tapered generally cylindrical wall of the guide rod 1609C
1609S upper surface of die 1605
1642 tapered exterior portion of sleeve 1604
1643 tapered exterior surface of sleeve 1604
1643A intermediate portion of sleeve 1604
1644 exterior end portion of the sleeve 1604
1645 radially curved end portion of the sleeve 1604
1646 end portion of the sleeve 1604
1647 edge of sleeve 1604
1648 first leg of the first gripping portion of sleeve 1604
1648A second leg of first gripping portion of sleeve 1604
1649 inner diameter of sleeve 1604
1649A first sharp inner circumferential biting edge of sleeve 1604
1649B second sharp inner circumferential biting edge of sleeve 1604
1650 inner concavity of second gripping portion of sleeve 1604
1651 fourth leg of second gripping portion of sleeve 1604
1652 third leg of second gripping portion of sleeve 1604
1680 inner concavity of first gripping portion of sleeve 1604
1680A space
1680B space
1690 extended lip portion of sleeve 1604
1690A first end portion of sleeve 1604
1691 coated outer surface of sleeve 1604
1693 outer diameter of the sleeve 1604
1694 upper beveled edge portion of sleeve 1604
1696 interengagement of upper beveled edge portion 1694 of sleeve with sleeve engaging surface 1602C of gland 1602
1696A etched outer surface of coating 1691
1697 transverse axis
1698 longitudinal axis
1699 nominal diameter of exterior of sleeve
1700 cross-sectional view of the piston, die, cap, sleeve, gland and tubing of FIG. 16 assembled together with a gap 1701 between gland 1602 and die surface 1609S
1701 initial gap between gland and top surface 1609S of die 1609S
1800 enlargement of a portion of FIG. 17
1800A enlarged cross-sectional view of a portion of FIG. 18A 1900 cross-sectional view of the piston, die, cap, sleeve, gland and tubing of FIG. 16 assembled together
1901 no gap between gland 1602 and die 1605
2000 enlargement of a portion of FIG. 19
2000A enlargement of a portion of FIG. 20
2100 an enlarged cross-sectional view of the fitting secured to the connection body wherein the connection body includes a flow path 2106
2101 mating body/connection body
2102 threaded interconnection with the fitting
2103 sleeve engaging surface
2104 frusto-conical surface of the mating body
2105 bleed port to determine leaks
2106 counterbore in frusto-conically shaped structure
2107 inner diameter of the sleeve after compression
2108 outside diameter of the tube after flaring
2109 frusto-conically shaped structure of the connection body
2110 flow path/passageway in the connection body
2111 inner throat of the tube indicating extremely small throat deformation
2113 interengagement of the inner portion of the tube and the frusto-conical portion of the flaring cone
2121 interengagement between gland 702 about the thick-walled tube and the beveled edge 1694 of the sleeve
α angle defining the interior taper of the interior of sleeve 1604
ß angle defining first taper of exterior of sleeve 704
Δ angle defining the beveled exterior end portion of the sleeve 704
ε inclination angle of surfaces terminating in circumferential biting edges 1629A, 1649B
γ angle defining the upper beveled edge portion of sleeve 704
λ angle defining the beveled exterior end portion of the sleeve 1604
τ angle defining first taper of exterior of sleeve 1604
θ angle defining concavity or relief of sleeve 704
π angle defining the upper beveled edge portion of sleeve 1604

The invention has been set forth by way of example only. Those skilled in the art will readily recognize that changes may be made to the invention without departing from the spirit and the scope of the claims as set forth hereinbelow.

What is claimed is:

1. A process for making a tube fitting with a tube, the tube having a tube end portion formed by a cylindrical tube wall having a cylindrically shaped interior surface and a cylindrically shaped exterior surface, the cylindrically shaped interior surface defining an interior passageway, the process comprising the steps of:
sliding a sleeve over the tube end portion, the sleeve having at a forward end portion a radially inner annular cavity forming an annular shoulder that terminates at an inner circumferential biting edge;
positioning the sleeve and tube end portion in a die, the die including a guide rod having a tapered flaring surface for engaging the interior surface of the tube wall and a tapered sleeve engaging surface radially outwardly and rearwardly offset from the tapered flaring surface of the guide rod;
axially driving the die relative to the sleeve and tube end portion so that
(a) the tapered flaring surface of the guide rod radially outwardly flares a leading portion of the tube wall, and (b) the tapered sleeve engaging surface radially inwardly urges the inner circumferential biting edge of the sleeve into the exterior surface of the tube wall, thereby extruding the tube wall into the annular cavity.

2. The process of claim 1, including using a gland to restrain the sleeve in position with respect to the die.

3. The process of claim 1, wherein the exterior of the sleeve is coated with a diamond embedded chromium coating.

4. The process of claim 3, wherein the coating on the exterior of the sleeve is etched.

5. The process of claim 1, including applying a lubricant to the die prior to placing an end portion of a tube into engagement with the die.

6. The process of claim 1, including using a gland to restrain the sleeve in position with respect to the die, and wherein the step of driving the die into the tube continues until the die abuts the gland.

7. The process of claim 1, wherein the tapered flaring surface and the tapered sleeve engaging surface are unitary with respect to one another.

8. The process of claim 1, wherein the tapered flaring surface of the guide rod radially outwardly flares a leading portion of the tube wall simultaneously with the tapered sleeve engaging surface radially inwardly urging the inner circumferential biting edge of the sleeve into the exterior surface of the tube wall.

9. The process of claim 1, wherein the leading portion of the tube wall is flared by the tapered flaring surface to the leading end of the tube wall.

10. A process for making a tube fitting for use in combination with a tube, the tube including a passageway therethrough defined by a cylindrically shaped interior surface, the tube including a cylindrically shaped exterior surface, the tube including a wall portion, and, the tube including an end portion, the process comprising the steps of:

placing an end portion of the tube into engagement with a die, the end portion of the tube engages a surface of a tapered, generally cylindrical, wall of a guide rod of the die such that the interior surface of the tube engages the tube engaging surface of the tapered, generally cylindrical wall of the guide rod of the die, the tube further engages a transitioning surface from the guide rod to the bottom of the die;

the die supported by a driving piston;

sliding a sleeve over the tube, the sleeve including a first end portion, an intermediate portion and a second end portion; an inner bore through the first end portion, the intermediate portion and the second end portion of the sleeve; the inner bore of the sleeve including an interior surface; the sleeve including an exterior surface;

the first end portion of the sleeve including a first varying wall thickness between the interior surface and the exterior surface of the sleeve proximate the first end portion; the second end portion of the sleeve including a second varying wall thickness between the interior surface and the exterior surface of the sleeve proximate the second end portion;

the intermediate portion of the sleeve including a varying wall thickness between the interior surface and the exterior surface of the sleeve proximate the intermediate portion; the inner bore of the sleeve through the first end portion including a first shoulder terminating in a first sharp inner circumferential biting edge; the inner bore of the sleeve through the first end portion including a second shoulder terminating in a second sharp inner circumferential biting edge; and, the first sharp inner circumferential biting edge having a first diameter and the second sharp inner circumferential biting edge having a second diameter;

restraining, using a gland, the sleeve in position with respect to the sleeve and the die;

driving the die into the tube and the sleeve with the driving piston flaring the end portion of the tube and securing the sleeve into forceful engagement with the tube, the die forcing the first sharp inner circumferential biting edge into and through the exterior of the end portion of the tube and into the wall portion of the end portion of the tube without narrowing the passageway of the tube, and, the die forcing the second sharp inner circumferential biting edge into and through the exterior of the end portion of the tube and into the wall portion of the end portion of the tube without narrowing the passageway of the tube; and wherein the end portion of the tube is flared to the leading end of the tube wall.

11. The process of claim 10, wherein the exterior of the sleeve is coated with a diamond embedded chromium coating.

12. The process of 11, wherein the coating on the exterior of the sleeve is etched.

13. The process of claim 10, further comprising the step of applying a lubricant to the die prior to placing an end portion of athe tube into engagement with the die.

14. The process of claim 10, wherein the step of driving the die into the tube continues until the die abuts the gland.

15. The process of claim 10, wherein the step of driving the die into the tube and the sleeve with the driving piston, flaring the end of the tube, and securing the sleeve into forceful engagement with the tube, includes forcing the first and second sharp inner circumferential biting edges into and through the exterior of the end portion of the tube and into the wall portion of the end portion of the tube equidistantly without narrowing the passageway of the tube.

* * * * *